United States Patent
Smetana

(10) Patent No.: US 8,173,739 B2
(45) Date of Patent: May 8, 2012

(54) OPTICAL POLYMERIC COMPOSITION AND METHOD OF MAKING SAME

(75) Inventor: David A. Smetana, North Canton, OH (US)

(73) Assignee: Suncolor Corporation, North Canton, OH (US)

( * ) Notice: Subject to any disclaimer, the term of this patent is extended or adjusted under 35 U.S.C. 154(b) by 395 days.

(21) Appl. No.: 12/423,863

(22) Filed: Apr. 15, 2009

(65) Prior Publication Data

US 2009/0258977 A1    Oct. 15, 2009

Related U.S. Application Data

(60) Provisional application No. 61/045,048, filed on Apr. 15, 2008.

(51) Int. Cl.
*C08K 5/52* (2006.01)

(52) U.S. Cl. ........ 524/500; 524/506; 524/537; 524/539; 524/413; 524/437; 524/394; 524/588

(58) Field of Classification Search .................. 524/500, 524/506, 537, 539, 413, 437, 394, 588
See application file for complete search history.

(56) References Cited

U.S. PATENT DOCUMENTS

2009/0029172 A1    1/2009 Isozaki
2009/0208755 A1 *  8/2009 Isozaki et al. ................. 428/412

FOREIGN PATENT DOCUMENTS

| | | |
|---|---|---|
| EP | 2 048 189 | 4/2009 |
| EP | 2 048 189 A1 * | 4/2009 |
| EP | 2048189 | 4/2009 |
| WO | 2006087880 | 8/2006 |
| WO | 2008/045984 | 4/2008 |
| WO | 2008045984 | 4/2008 |
| WO | 2008016048 | 7/2008 |

OTHER PUBLICATIONS

International Preliminary Report on Patentability, Application No. PCT/US2009/040588, mailed Oct. 28, 2010.
Invitation to Pay Additional Fees and Partial International Search Report, Application No. PCT/US2009/040588, mailed Jun. 26, 2009.
International Search Report and Written Opinion, Application No. PCT/US2009/040588, mailed Oct. 1, 2009.

* cited by examiner

*Primary Examiner* — Robert D. Harlan
(74) *Attorney, Agent, or Firm* — Renner, Otto, Boisselle & Sklar, LLP

(57) ABSTRACT

The invention relates to a polymer composition, comprising: (i) at least one thermoplastic resin having a glass transition temperature of at least about 220° C.; (ii) at least one phenylalkoxysilane, biphenol, trisilanolphenyl polyhedral oligomeric silesquioxane, or mixture of two or more thereof; (iii) inorganic particulates having an average particle size in the range up to about 100 nanometers dispersed in the thermoplastic resin, the inorganic particulates having an index of refraction in the range from about 1.4 to about 3; and (iv) an effective amount of at least one dispersant to disperse the inorganic particulates in the thermoplastic resin; with the proviso that when the trisilanolphenyl polyhedral oligomeric silesquioxane is in the form of particulates with an average particle size up to about 100 nanometers, the trisilanolphenyl polyhedral oligomeric silesquioxane particulates are optionally used as both component (ii) and as a partial or complete replacement for the inorganic particulates in component (iii). The polymer composition may be a high temperature thermoplastic suitable for forming, such as by molding, optical articles such as lenses.

6 Claims, 2 Drawing Sheets

Image No. 1          Image No. 2

OPTICAL POLYMERIC COMPOSITION AND METHOD OF MAKING SAME

This application claims priority under 35 U.S.C. §119(e) to U.S. Provisional application Ser. No. 61/045,048, filed Apr. 15, 2008. This prior application is incorporated herein by reference.

TECHNICAL FIELD

This invention relates to optical polymeric compositions as well as methods of making such compositions. The invention relates to articles, such as plastic lenses, made from these polymeric compositions.

BACKGROUND

Plastic lenses, glass lenses, and silicone lenses often perform the same function in optical systems, such as in cameras, automotive lighting, military night vision equipment, and, particularly, LEDs (Light Emitting Diodes).

SUMMARY

The main attributes that separate plastic lenses from glass lenses are lower weight, better impact resistance, and lower cost. Glass, however, is more stable at very high temperatures. The difference in cost is due largely to the difference in manufacturing processes that are required for the two materials and the relative temperatures required to form the materials. Plastic lenses are typically produced at about 230-390° C. using injection molding at cycle times that are about 10 times faster than glass lenses. Glass lenses are typically produced using grinding and polishing or compression molding at about 625° C. Silicone lenses have very high temperature resistance, yet are more expensive to produce than glass. Silicone materials typically cost at least about 3-5 times as much as glass and plastic materials, and require costly molds for either compression molding or liquid injection processing which are performed at relatively slow production rates. It is easier and less expensive to mold special details into plastic lenses than glass and silicone lenses.

Industrial lens devices, such as camera lens and LED lens devices, are typically assembled in solder reflow ovens. Traditionally, lead has been used as an ingredient in the solder to reduce the melting temperature of the solder to just under about 200° C. The problem is that it is often desirable to use lead free solder and the temperature required to melt lead free solder may be about 217° C. or higher. This has led to the requirement of solder reflow ovens that operate at higher temperatures with operating temperatures that typically peak at about 250-285° C. The increase in the processing temperatures for solder reflow ovens has created the need for injection moldable, optically clear thermoplastics that have significantly higher glass transition temperatures (Tg).

Optical thermoplastic compositions generally require a unique balance of properties for use in making optical lens products, and the like However, it is difficult to balance these properties in a thermoplastic composition due to the fact that when improving one property, other properties are often compromised. For example, if an organic UV stabilizer is used in the thermoplastic composition to improve photolytic oxidative stability, the thermoplastic composition, when molded in the deep blue range of the visible spectrum from 400 to 500 nanometers (nm), often exhibits a decreasing light transmission in the visible range from 400 to 500 nm. In another example, if a fatty acid ester or fatty amide is used in the thermoplastic composition to improve hydrolytic oxidative stability, the thermoplastic composition, when molded, often exhibits a decreasing thermal resistance, thermal oxidative stability and optical transmission. This invention provides a solution to this problem.

This invention relates to a polymeric composition that exhibits enhanced photolytic, hyrdrolytic, and thermal oxidative stability characteristics. The inventive polymeric composition exhibits moldability and optical and mechanical properties that are suitable for providing optical lens products, and the like. These compositions may be used commercially, at high temperature profiles, in lead free solder reflow applications with reduced defect rates. These compositions may be used in LED and high brightness (HB) LED applications with long service lives under strenuous environmental conditions, including heating to about 150° C. and high humidity, while being irradiated with light from a LED source having a wavelength from about 390 nm to about 1200 nm, and in one embodiment from about 400 nm to about 500 nm. The molded products may be mass-produced economically at high speed and high production rates, with consistent quality control, in a myriad of shapes and designs, with precise detail. Injection molding or injection-compression molding methods may be used.

Unexpectedly, it has been discovered that by adding one or more alkoxysilanes, in the form of one or more phenyltrialkoxysilanes or a mixture of one or more phenyltrialkoxysilanes with one or more diaminotrialkoxysilanes, to the polymer compositions, significant increases in thermal stability may be achieved. This has resulted in the discovery of ultrahigh temperature stable, optical, ceramic thermoplastic polymer compositions. These compositions may also exhibit enhanced resistance to moisture and short wave visible light. These compositions may be hydrophobic. It has also been discovered that these compositions may be used to form homogeneous articles exhibiting very low stress and birefringence using automated processes such as injection molding and injection-compression molding. These compositions may comprise a ceramic phase and an organic phase. The ceramic phase, which may comprise inorganic particulates having an average particle size up to about 100 nm, is believed to assist with the thermal stability of the organic phase and acts as a dispersant and rheological aid for injection molding, while contributing to the homogeneity of the polymer composition. It has also been discovered that using calcined, gamma-aluminum oxide, delta-aluminum oxide, or delta-theta aluminum oxide particles may enhance and increase the thermal stability of the polymer compositions during solder reflow processing, particularly lead free solder reflow processing, at temperatures from about 250° C. to about 285° C., and in one embodiment from about 260° C. to about 285° C. These particles may scavenge moisture from the amorphous polymer and internally bind the moisture in the particles when exposed to temperatures up to about 285° C. or higher. The resulting composition may be hard, optically clear, and impact resistant. These compositions may be injection molded at high speeds with precise detail.

This invention relates to a polymer composition, comprising: (i) at least one thermoplastic resin having a glass transition temperature of at least about 220° C.; (ii) at least one phenylalkoxysilane, biphenol, trisilanolphenyl polyhedral oligomeric silesquioxane, or mixture of two or more thereof; (iii) inorganic particulates having an average particle size in the range up to about 100 nanometers dispersed in the thermoplastic resin, the inorganic particulates having an index of refraction in the range from about 1.4 to about 3; and (iv) an effective amount of at least one dispersant to disperse the inorganic particulates in the thermoplastic resin; with the proviso that when the trisilanolphenyl polyhedral oligomeric silesquioxane is in the form of particulates with an average particle size up to about 100 nanometers, the trisilanolphenyl polyhedral oligomeric silesquioxane particulates are optionally used both component (ii) and as a partial or complete replacement for the inorganic particulates in component (iii).

The polymer composition referred to above may be regarded as a "pre-molded" polymer composition, that is, a polymer composition that is formulated from the ingredients identified above, the polymer composition being capable of being molded to form a molded article such as a lens.

In one embodiment, the composition may further comprise at least one vinyltrialkoxysilane or at least one diaminotrialkoxysilane. In one embodiment, the composition may further comprise at least one antihydrolysis agent. In one embodiment, the composition may further comprise at least one biphenol compound. In one embodiment, the composition may further comprise at least one bluing agent. In one embodiment, the composition may further comprise at least one ultraviolet light absorber. In one embodiment, the composition may further comprise at least one antioxidant. In one embodiment, the composition further comprises one or more heat stabilizers, antistatic agents, pigments, dyes, optical brighteners, flame retardants, or a mixture of two or more thereof. In one embodiment, the composition may further comprise one or more melt processable glass reinforcing resins or materials.

In one embodiment, the invention relates to an additive composition made by combining: (a) at least one dispersant; (b) inorganic particulates having an average particle size in the range up to about 100 nanometers, the inorganic particulates having an index of refraction in the range from about 1.4 to about 3; at least one phenylalkoxysilane, (c) phenylalkoxysilane, biphenol, trisilanolphenyl polyhedral oligomeric silesquioxane, or a mixture of two or more thereof; and (d) at least one dye concentrate comprising (i) at least one dispersant, (ii) at least one bluing agent, and (iii) inorganic particulates having an average particle size in the range up to about 100 nanometers, the inorganic particulates having an index of refraction in the range from about 1.4 to about 3; with the proviso that when the trisilanolphenyl polyhedral oligomeric silesquioxane is in the form of particulates with an average particle size up to about 100 nanometers, the trisilanolphenyl polyhedral oligomeric silesquioxane particulates are optionally used both as component (c) and as a partial or complete replacement for component (b). The additive composition may further comprise at least one vinyltrialkoxysilane or at least one diaminotrialkoxysilane. The additive composition may further comprise one or more antioxidants, UV light stabilizers, heat stabilizers, antistatic agents, pigments, dyes, optical brighteners, flame retardants, or a mixture of two or more.

In one embodiment, the invention relates to a polymer composition comprising at least one thermoplastic resin having a glass transition temperature of at least about 220° C. and the foregoing additive composition.

In one embodiment, the invention relates to a molded article comprising the foregoing polymer composition. The molded article may comprise a lens.

In one embodiment, the invention relates to a method of making a polymer composition, comprising: heating pellets of a thermoplastic resin at a temperature of at least about 70° C., the thermoplastic resin having a glass transition temperature of at least about 220° C.; and coating the pellets with the foregoing additive composition.

In one embodiment, the invention relates to a process of forming an article, comprising: feeding pellets comprising a thermoplastic resin having a glass transition temperature of at least about 220° C. coated with the foregoing additive composition, to an injection molding apparatus and molding the article.

In one embodiment, the invention relates to a method of making a polymer composition, comprising: (A) heating pellets of a thermoplastic resin at a temperature of at least about 70° C., the thermoplastic resin having a glass transition temperature of at least about 220° C.; (B) coating the pellets with an additive composition comprising at least one dispersant, inorganic particulates having an average particle size in the range up to about 100 nanometers, the inorganic particulates having an index of refraction in the range from about 1.4 to about 3, and at least one dye concentrate; and (C) coating the pellets from step (B) with at least one phenylalkoxysilane, biphenol, trisilanolphenyl polyhedral oligomeric silesquioxane, or a mixture of two or more thereof; with the proviso that when the trisilanolphenyl polyhedral oligomeric silesquioxane is in the form of particulates with an average particle size up to about 100 nanometers, the trisilanolphenyl polyhedral oligomeric silesquioxane particulates are optionally used as a partial or complete replacement for the inorganic particulates added in step (B) and if the trisilanolphenyl polyhedral oligomeric silesquioxane particulates are added in step (B), step (C) is optional. In one embodiment, during step (C) the pellets from step (B) may also be coated with at least one vinyltrialkoxysilane or at least one diaminotrialkoxysilane.

In one embodiment, the invention relates to a method of making a polymer composition, comprising: (A) heating pellets of a thermoplastic resin at a temperature of at least about 70° C., the thermoplastic resin having a glass transition temperature of at least about 220° C.; (B) coating the pellets with at least one phenylalkoxysilane, biphenol, trisilanolphenyl polyhedral oligomeric silesquioxane, or a mixture of two or more thereof; and (C) coating the pellets from step (B) with an additive composition comprising at least one dispersant, inorganic particulates having an average particle size in the range up to about 100 nanometers, the inorganic particulates having an index of refraction in the range from about 1.4 to about 3, and at least one dye; with the proviso that when the trisilanolphenyl polyhedral oligomeric silesquioxane is in the form of particulates with an average particle size up to about 100 nanometers, the trisilanolphenyl polyhedral oligomeric silesquioxane particulates added in step (B) are optionally used as a partial or complete replacement for the inorganic particulates added in step (C) and if the trisilanolphenyl polyhedral oligomeric silesquioxane particulates are added in step (B), the addition of an additional amount of particulates during step (C) is optional. In one embodiment, during step (B) the pellets may also be coated with at least one vinyltrialkoxysilane or at least one diaminotrialkoxysilane.

In one embodiment, the invention relates to a method of making a polymer composition, comprising: (A) compounding pellets of a thermoplastic resin at a temperature in the range from about 300° C. to about 350° C. using a single screw or twin screw compounder, the compounder comprising conveying elements or low shear mixing elements, the thermoplastic resin having a glass transition temperature of at least about 220° C.; (B) metering into the compounder at least one phenylalkoxysilane, biphenol, trisilanolphenyl polyhedral oligomeric silesquioxane, or a mixture of two or more thereof; and (C) metering into the compounder an additive composition comprising at least one dispersant, inorganic particulates having an average particle size in the range up to about 100 nanometers, the inorganic particulates having an index of refraction in the range from about 1.4 to about 3, at least one antihydrolysis agent, and at least one dye; with the proviso that when the trisilanolphenyl polyhedral oligomeric silesquioxane is in the form of particulates with an average particle size up to about 100 nanometers, the trisilanolphenyl polyhedral oligomeric silesquioxane particulates added in step (B) are optionally used as a partial or complete replacement for the inorganic particulates added in step (C), and if the trisilanolphenyl polyhedral oligomeric silesquioxane particulates are added in step (B), the addition of an additional amount of particulates during step (C) is optional. Step (B) may precede step (C), or step (C) may precede step (B). In one embodiment, during step (B) at least one vinyltrialkoxysilane or at least one diaminotrialkoxysilane may be metered into the compounder.

In one embodiment, the invention relates to a method of making a polymer composition, comprising: (A) heating pellets of a thermoplastic resin at a temperature of at least about 70° C., the thermoplastic resin having a glass transition temperature of at least about 220° C.; (B) coating the pellets from step (A) with an additive composition comprising at least one dispersant, inorganic particulates having an average particle size in the range up to about 100 nanometers, the inorganic particulates having an index of refraction in the range from about 1.4 to about 3, and at least one dye concentrate; (C) metering into a single screw or twin screw compounder the pellets from step (B), the compounder comprising conveying elements or low shear mixing elements; and (D) metering into the compounder at least one phenylalkoxysilane, biphenol, phenylalkoxysilane, biphenol, trisilanolphenyl polyhedral oligomeric silesquioxane or a mixture of two or more thereof; with the proviso that when the trisilanolphenyl polyhedral oligomeric silesquioxane is in the form of particulates with an average particle size up to about 100 nanometers, the trisilanolphenyl polyhedral oligomeric silesquioxane particulates added in step (D) are optionally used as a partial or complete replacement for the inorganic particulates added in step (B), and if the trisilanolphenyl polyhedral oligomeric silesquioxane particulates are added in step (D), the addition of an additional amount of particulates during step (B) is optional. In one embodiment, during step (D) at least one vinyltrialkoxysilane or at least one diaminotrialkoxysilane may be metered into the compounder.

DETAILED DESCRIPTION

Figure 1:
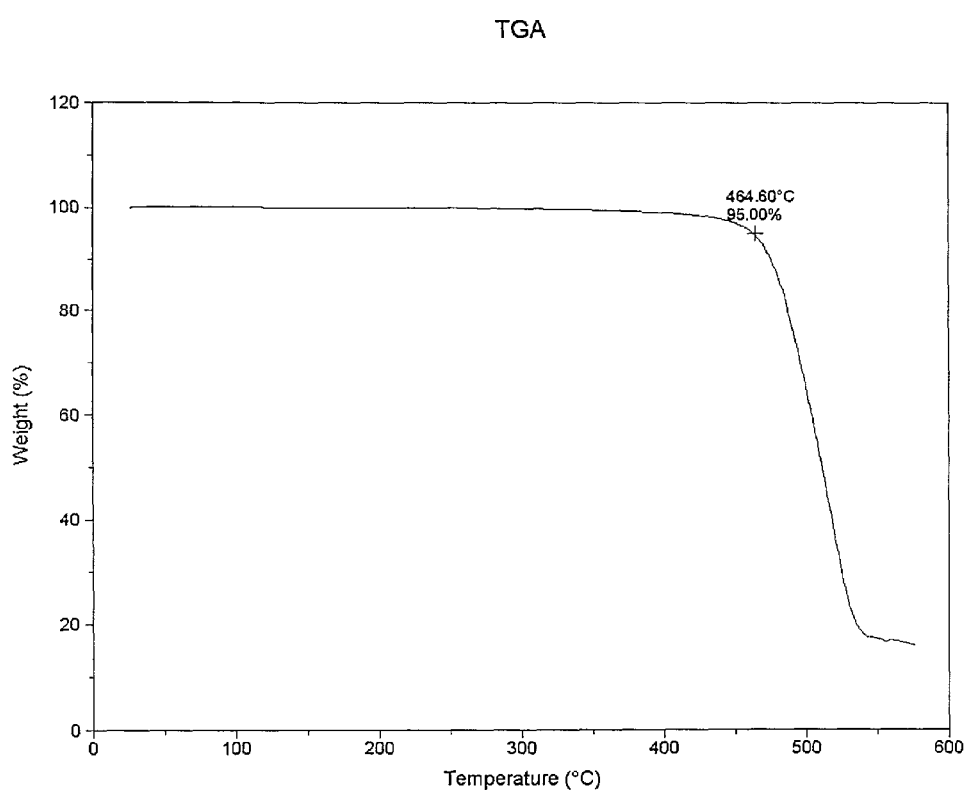
FIG. 1 is a thermal gravimetric analysis (TGA) plot for the polymer disclosed in Example 1.

All ranges and ratio limits disclosed in the specification may be combined. It is to be understood that unless specifically stated otherwise, references to "a," "an," and/or "the" may include one or more than one and that reference to an item in the singular may also include the item in the plural.

The polymer composition may comprise at least one thermoplastic resin having a glass transition temperature (Tg) of at least about 220° C., and in one embodiment at least about 225° C., and in one embodiment at least about 230° C., and in one embodiment at least about 235° C. The thermoplastic resin may comprise one or more of polycarbonate, polysulfone, polyolefin (e.g., polypropylene), polystyrene, polyalkylene terephthates (e.g., polyethylene terephthalates (PET)), or a mixture of two or more thereof. Copolymers of two or more of the foregoing may be used. The term "copolymer" is used herein to refer to a polymer composition containing two or more different repeating units. The term copolymer is meant to encompass copolymers, terpolymers, and the like.

The polycarbonates may comprise one or more homopolycarbonates, copolycarbonates, thermoplastic polyester-carbonates, or a mixture of two or more thereof. The polycarbonate may comprise at least one bisphenol of the general formula HO—Z—OH, wherein Z is a divalent organic group having from about 6 to about 30 carbon atoms and one or more aromatic groups. The bisphenol may comprise one or more dihydroxydiphenyls, bis(hydroxyphenyl)alkanes, indanebisphenols, bis(hydroxy-phenyl)ethers, bis(hydroxyphenyl)sulfones, bis(hydroxyphenyl)ketones, α,α'-bis(hydroxyphenyl)-diisopropylbenzenes, and the like. Examples of bisphenols that may be used may include para, para isopropylidene diphenol (bisphenol A), tetraalkylbisphenol A, 4,4-(meta-phenylenediisopropyl)-diphenol (bisphenol M), 4,4-(para-phenylenediisopropyl)-diphenol, 1,1-bis-(4-hydroxyphenyl)-3,3,5-trimethylcyclohexane (bisphenol TMC), or a mixture of two or more thereof. The polycarbonate may comprise a homopolycarbonate based on monomers of bisphenol A. The polycarbonate may comprise a copolycarbonate based on monomers of bisphenol A and bisphenol TMC. The bisphenol may be reacted with one or more carbonic acid compounds, for example, phosgene, diphenyl carbonate or dimethyl carbonate.

The polycarbonate may comprise a mixture of two or more polycarbonates. For example, the polycarbonate may comprise a mixture of a polycarbonate made from bisphenol A and a polycarbonate made from bisphenol TMC.

Polyester-carbonates may be obtained by reaction of one or more of the foregoing bisphenols with one or more aromatic dicarboxylic acids and optionally one or more carbonic acid equivalents. The aromatic dicarboxylic acids may include, for example, orthophthalic acid, terephthalic acid, isophthalic acid, 3,3'- or 4,4'-diphenyidicarboxylic acid, one or more benzophenonedicarboxylic acids, or a mixture of two or more thereof. Up to about 80 mol %, and in one embodiment from about 20 to about 50 mol %, of the carbonate groups in the polycarbonate may be replaced by aromatic dicarboxylic acid ester groups.

Inert organic solvents may be used in the reaction to form the polycarbonate. These may include methylene chloride, dichloroethane, chloropropane, carbon tetrachloride, chloroform, chlorobenzene, chlorotoluene, or a mixture of two or more thereof.

The reaction to form the polycarbonate may be accelerated by catalysts, such as tertiary amines, N-alkylpiperidines, onium salts, or a mixture of two or more thereof. Tributylamine, triethylamine and/or N-ethylpiperidine may be used.

The polycarbonate may be branched deliberately and in a controlled manner by the use of small amounts of branching agents. Suitable branching agents may include, for example, phloroglucinol; 4,6-dimethyl-2,4,6-tri-(4-hydroxyphenyl)-hept-2-ene; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-4-hydroxyphenyl)-cyclohexyl]propane; 2,4-bis-(4-hydroxyphenyl-isopropyl)- phenol; 2,6-bis-(2-hydroxy-5'-methyl-benzyl)-4-methylphenol; 2-(4-hydroxyphenyl)-2-(2,4-dihydroxyphenyl)-propane; hexa-(4-(4-hydroxyphenyl-isopropyl)-phenyl)-orthoterephthalic acid ester, tetra-(4-hydroxyphenyl)-methane; tetra-(4-(4-hydroxyphenyl-isopropyl)-phenoxy)-methane; α, α', α"-tris-hydroxyphenyl-1,3,5-triisopropylbenzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4"-dihydroxytriphenyl)-methyl)benzene; 1,1,1-tri-(4-hydroxyphenyl)-ethane and/or 3,3-bis-(3-methyl-4-hydroxyphenyl)-2-oxo-2,3-dihydroindole.

One or more chain stoppers may be used in the reaction to form the polycarbonate. The chain stopper may comprise one or more phenols, such as phenol, alkylphenols, such as cresol or 4-tert-butylphenol, chlorophenol, bromophenol, cumylphenol, or mixtures of two or more thereof.

The polycarbonate may be referred to as being an injection moldable, optically clear thermoplastic with a high glass transition temperature (Tg). The polycarbonate may have a Tg of at least about 200° C., and in one embodiment from about 200 to about 235° C., or higher. The Tg may be at least about 220° C., and in one embodiment at least about 227° C., and in one embodiment at least about 235° C. The Tg may be in the range from about 220 to about 290° C., and in one embodiment from about 220° C. to about 260° C., and in one embodiment from about 235° C. to about 290° C., and in one embodiment from about 235° C. to about 260° C.

The polycarbonate may have a weight average molecular weight ($M_W$) in the range from about 20,000 to about 40,000, and in one embodiment in the range from about 26,000 to about 36,000, and in one embodiment in the range from about 28,000 to about 35,000, and in one embodiment from about 31,000 to about 35,000, and in one embodiment about 33,000, as determined by measuring the relative solution viscosity of the polycarbonate in methylene chloride or in a mixture of equal amounts by weight of phenol/-o-dichlorobenzene, calibrated by light scattering.

The polycarbonate may be produced by the synthesis of bisphenol A with bisphenol TMC. Alternatively, a mixture of a polycarbonate made from bisphenol A and a polycarbonate made from bisphenol TMC may be used. The polycarbonate may have a Vicat Softening Temperature in the range of from about 225° C. to about 235° C., and a Tg greater than about 227° C. Polycarbonates available from Bayer under the trade designation APEC® TP 0277 may be used.

The concentration of the thermoplastic resin in the polymer composition may be at least about 15% by weight, and in one embodiment at least about 50% by weight, and in one embodiment at least about 75% by weight, and in one embodiment at least about 90% by weight, and in one embodiment at least about 95% by weight, and in one embodiment at least about 97.3% by weight, and in one embodiment in the range from about 15 to about 99.8% by weight based on the total weight of the polymer composition, and in one embodiment from about 50 to about 99.8% by weight, and in one embodiment from about 75 to about 99.8% by weight, and in one embodiment from about 90 to about 99.8% by weight, and in one embodiment from about 95 to about 99.8% by weight, and in one embodiment from about 97.3 to about 99.75% by weight.

The inventive polymer composition may comprise one or more phenylalkoxysilanes, biphenols, or a mixture thereof. These compounds are believed to provide the inventive polymer compositions with enhanced thermal stability and reduced flow or mold-in stress and birefringence. Decreasing or eliminating flow or mold-in stress may be a significant consideration in providing for the production of molded optical articles and lenses due to the fact that there appears to be a linear relationship between flow or mold-in stress and birefringence. The greater the flow or mold-in stress, the greater the birefringence. Also, molded optical articles having a high degree of flow or mold-in stress may shrink or warp when exposed to high temperatures associated with solder reflow processing, particularly lead free solder reflow processing.

The phenylalkoxy silanes may each contain one or more phenyl groups and one or more alkoxy groups. Each alkoxy group may contain from 1 to about 5 carbon atoms, and in one embodiment from 1 to about 3 carbon atoms, and in one embodiment 1 or 2 carbon atoms. Examples may include phenyltrialkoxysilanes such as phenyltrimethoxysilane, phenyltriethoxysilane, or a mixture thereof, and diphenyldialkoxysilanes such as diphenyldimethoxysilane. An example of a phenyltrimethoxysilane that may be used is available from Degussa under the name Dynasylan 9165. An example of a phenyltriethoxysilane that may be used is available from Shin-Etsu Silicones under the name KBE-103. An example of a diphenyldimethoxysilane that may be used is available from Shin-Etsu Silicones under the name KBM-202SS.

The biphenol may comprise 4,4'-biphenol which is available from Schenectady International, Schenectady, N.Y. The biphenol may be used at a concentration in the range up to about 5% by weight of the polymer composition, and in one embodiment from about 0.03 to 3% by weight, and in one embodiment from 0.05 to 2% by weight.

The trisilanolphenyl polyhedral oligomeric silsesquioxanes (which may be referred to as trisilanolphenyl POSS) may include the branched versions thereof. This material may be in the form of nanoparticles. These particulates may have a particle size up to about 100 nm. Examples may include one or more tri-silanolphenyl polyhedral oligomeric silesquioxanes available from Hybrid Plastics. An example of this may be TriSilanolPhenyl POSS SO1458. The trisilanolphenyl polyhedral oligomeric silesquioxane may have the empirical formula $C_{42}H_{38}O_{12}Si_7$. This material may have the following structure

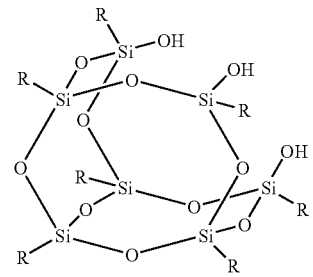

where R is phenyl This material may be listed in Chemical Abstracts at CAS[444315-26-8]. These compounds may be used at a concentration in the range from about 0.01 to about 10%, or from about 0.05 to about 7%, or from about 0.1 to 5% by weight of the total weight of the polymeric composition. When the trisilanolphenyl POSS is in the form of nanoparticles, it optionally may be used as a partial or complete replacement for the inorganic particulates discussed below.

Unexpectedly, it has been discovered that by increasing the phenyl concentration in the polymer composition, the light transmission of the molded polymer composition may be enhanced in the range from about 360 nm to about 470 nm, and in one embodiment in the range from about 400 nm to about 460 nm. This may improve the photlytic oxidate stability of the polymer composition when exposed to short wave visible light of from about 400 nm to about 470 nm.

The polymer composition may further comprise at least one vinyltrialkoxysilane or at least one diaminotrialkoxysilane. Each alkoxy group in these materials may contain from 1 to about 5 carbon atoms, and in one embodiment 1 to about 3 carbon atoms, and in one embodiment 1 or 2 carbon atoms. An example of a vinyltrialkoxysilane that may be used is vinyltrimethoxysilane. A vinyltrimethoxysilane that may be used is available from Whacker Chemical Corp. under the name Geniosil XL 10. A diaminotrialkoxy silane that may be used is N-(2-aminoethyl)-3-aminopropyl trimethoxysilane. An example of a N-(2-aminoethyl)-3-aminopropyl trimethoxysilane that may be used is available from Degussa under the name Dynasylan DAMO. When the vinyltrialkoxysilane or diaminotrialkoxysilane is used, the weight ratio of the vinyltrialkoxysilane or diaminotrialkoxysilane to the phenylalkoxysilane or biphenol may be up to about 1:1, and in one embodiment from about 0.01:1 to about 1:1, and in one embodiment from about 0.1:1 to about 1:1, and in one embodiment from about 0.2:1 to about 1:1, and in one embodiment from about 0.5:1 to about 1:1, and in one embodiment from about 0.7:1 to about 1:1.

The concentration of the silanes (phenylalkoxysilane by itself or in combination with the vinyltrialkoxysilane or diaminotrialkoxysilane) in the polymer composition may be in the range up to about 20% by weight, and in one embodiment from about 0.02 to about 20% by weight, and in one embodiment from about 0.05 to about 10% by weight, and in one embodiment from about 0.10 to about 2.5% by weight.

The inorganic particulates may be referred to as nanomaterials, for example, transparent nanomaterials and/or as high temperature resistant nanomaterials. These particulates may be used to enhance the dispersion of visible light in molded articles made from the polymer composition. As such, these particulates may contribute to providing optically clear molded articles made from the polymer composition. These particulates may also serve as a dispersant aid, suspension aid, and/or flow aid for the thermoplastic resin. These particulates, particularly in the calcined gamma and delta or delta theta phases, may also serve as moisture scavengers and contribute to the hydrolytic resistance of the polymer and the thermal resistance of the polymer when exposed to high temperature solder reflow processes.

The inorganic particulates may comprise aluminum oxide, fused aluminum dioxide, aluminum oxyhydroxide, calcined alumina oxide, gamma aluminum oxide, delta alumina oxide, delta-theta alumina oxide, alpha alumina oxide, silicon dioxide, silicon, cerium oxide, titanium dioxide, zirconium oxide, or a mixture of two or more thereof. The average particle size of the inorganic particulates may be in the range up to about 100 nm, and in one embodiment in the range from about 1 to about 100 nm, and in one embodiment in the range from about 1 to about 75 nm, and in one embodiment in the range from about 1 to about 50 nm, and in one embodiment in the range from about 3 to about 50 nm, and in one embodiment from about 5 to about 50 nm, and in one embodiment from about 5 to about 40 nm, and in one embodiment from about 5 to about 30 nm, and in one embodiment from about 5 to about 20 nm, and in one embodiment from about 5 to about 15 nm. The inorganic particulates may have a refractive index in the range from about 1.4 to about 3, and in one embodiment in the range from about 1.4 to about 2.5, and in one embodiment in the range from about 1.4 to about 2, and in one embodiment in the range from about 1.4 to about 1.8, and in one embodiment in the range from about 1.5 to about 1.6. The refractive index may be in the range from about 1.42 to about 3, and in one embodiment in the range from about 1.42 to about 2.5, and in one embodiment in the range from about 1.42 to about 2, and in one embodiment in the range from about 1.52 to about 1.58, and in one embodiment in the range from about 1.54 to about 1.58, and in one embodiment about 1.56. The inorganic particulates may have a relatively high zeta potential. The zeta potential may be at least about +30 mV or more negative than −30 mV, and in one embodiment at least about +35 mV or more negative than −35 mV. The inorganic particulates may be thermally stable at temperatures up to about 350° C., in one embodiment up to about 400° C., and in one embodiment up to about 600° C., and in one embodiment up to about 800° C., and in one embodiment up to about 1000° C. or higher. Examples of inorganic particulates that may be used may include Aluminum Oxide C and/or Aeroxide Alu US available from Degussa Corporation, and Puralox K-160 available from SASOL Corporation.

The inorganic particulates may be silane treated to enhance dispersion of the inorganic particulates into the polymer and to optionally couple the inorganic particulates to the polymer resin system. Examples of silanes that may be used may include Dynasylan OCTEO (octyltriethoxsilane), Dynasylan DAMO (N-2-aminoethyl-3-aminopropyltrimethoxysilane) and Dynasylan 9165 (phenyltrimethoxysilane). Blends of Dynasylan DAMO and Dynasylan 9165 may be used. These may be thermally stable at temperatures up to about 370° C. or higher and are available from Degussa Corporation.

The inorganic particulates may be surface treated with one or more titanates, one or more zirconates, or a mixture thereof. The titanates and zirconates may comprise one or more organometallic complexes of titanium or zirconium complexed by one or more organic compounds containing functional groups attached to a hydrocarbon linkage. The organic compounds may contain one or more, and in one embodiment, two or more functional groups. The functional groups may comprise one or more of =O, =S, —OR, —SR, —NR$_2$, —NO$_2$, =NOR, =NSR and/or —N=NR, wherein R is hydrogen or a hydrocarbon group (e.g., alkyl or alkenyl) of 1 to about 10 carbon atoms. The titanates and zirconates may include alkoxy titanates and coordinate zirconates. These may include the alkoxy titanates available under the tradenames LICA 12 or KR-PRO, from Kenrich Petrochemicals, Inc., Bayonne, N.J., and the coordinate zirconates available under the tradenames KZ 55 or KR 55, from Kenrich.

The concentration of the inorganic particulates in the polymer composition may be in the range up to about 30% by weight, and in one embodiment in the range from about 0.0001 to about 30% by weight, and in one embodiment in the range from about 0.0001 to about 25% by weight, and in one embodiment from about 0.0001 to about 20% by weight, and in one embodiment from about 0.0001 to about 10% by weight, and in one embodiment in the range from about 0.001 to about 5% by weight, and in one embodiment from about 0.01 to about 2% by weight, and in one embodiment from about 0.01 to about 1% by weight, based on the total weight of the polymer composition. The concentration of the inorganic particulates in the additive composition that may be used in making the polymer composition may be in the range from about 0.5 to about 20% by weight based on the total weight of the additive composition, and in one embodiment from about 1 to about 10% by weight.

The dispersant may comprise any material that enhances the dispersion of the inorganic particulates in the thermoplastic resin. The dispersant may comprise one or more fatty acids, fatty esters, fatty amides, fatty alcohols, polyhedral oligomeric silesquioxanes, or a mixture of two or more thereof. The fatty acids may comprise one or more saturated and/or unsaturated monocarboxylic acids of about 10 to about 36 carbon atoms, and in one embodiment from about 14 to about 26 carbon atoms, and in one embodiment about 12 to about 22 carbon atoms. The saturated monocarboxylic acids may comprise one or more of myristic acid, palmitic acid, stearic acid, arachidic acid, behenic acid, and/or hexatrieisocontanoic acid. The unsaturated monocarboxylic acids may comprise one or more of palmitoleic acid, oleic acid, linoleic acid, linolenic acid and/or cetoleic acid. Mixtures of two or more of the foregoing acids may be used.

The fatty esters may comprise one or more esters of one or more of the foregoing carboxylic acids and one or more alcohols. The alcohol may comprise one or more monohydric alcohols and/or one or more polyhydric alcohols. The monohydric alcohols may include alcohols of 1 to about 5 carbon atoms such as methyl alcohol, ethyl alcohol, propyl alcohol, butyl alcohol, pentyl alcohol, or a mixture of two or more thereof. The polyhydric alcohols may include glycerol, erythritol, pentaerythritol, dipentaerythritol, gluconic acid, glyceraldehyde, glucose, arabinose, 1,7-heptanediol, 2-4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis-(hydroxymethyl) cyclohexanol, 1,10-decanediol, digitalose, or a mixture of two or more thereof. Examples of the esters that may be used may include methylstearate, butylstearate, ethyloleate, butyllinoleate, glycerol monolaurate, glycerol monooleate, glycerol monoricinoleate, glycerol monostearate, glycerol distearate, glycerol tristearate, pentaerythritol tetrastearate, or a mixture of two or more thereof. The fatty ester may comprise one or more saturated fatty esters, one or more unsaturated fatty esters, or a mixture thereof. The fatty ester may comprise a solid material at room temperature, for example, a dry powder.

The fatty amides may comprise one or more amides of one or more of the foregoing carboxylic acids and ammonia and/or at least one amine. The amine may comprise one or more monoamines, one or more polyamines, one or more hydroxyamines and/or one or more alkoxylated amines. The monoamines may include methylamine, ethylamine, diethylamine, n-butylamine, di-n-butylamine, allylamine, isobutylamine, cocoamine, stearylamine, laurylamine, methyllaurylamine, oleylamine, N-methyl-octylamine, dodecylamine, octadecylamine, or a mixture of two or more thereof. The polyamines may include the alkylene polyamines such as ethylene diamine, diethylene, triamine, triethylene tetramine, tetraethylene pentamine, pentaethylene hexamine, propylene diamine, trimethylene diamine, hexamethylene diamine, decamethylene diamine, octamethylene diamene, di(heptamethylene) triamine, tripropylene tetramine, di(trimethylene) triamine, N-(2-aminoethyl) peperazine, or a mixture of two or more thereof. The hydroxyamines may comprise one or more primary alkanol amines, one or more secondary alkanol amines, or a mixture thereof. The hydroxyamines may be referred to as aminoalcohols. Examples may include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propanediol, 2-amino-2-ethyl-1,3-propanediol, N-(beta-hydroxypropyl)-N'-(beta-aminoethyl)-piperazine, tris(hydroxymethyl) amino methane, 2-amino-1-butanol, ethanolamine, beta-(beta-hydroxyethoxy)-ethyl amine, glucamine, glusoamine, N-3-(aminopropyl)-4-(2-hydroxyethyl)-piperadine, 2-amino-6-methyl-6-heptanol, 5-amino-1-pentanol, N-(beta-hydroxyethyl)-1,3-diamino propane, 1,3-diamino-2-hydroxypropane, N-(beta-hydroxy ethoxyethyl)-ethylenediamine, trismethylolaminomethane, or a mixture of two or more thereof. The alkoxylated amines may include the alkoxylated alkylene polyamines such as N,N(diethanol) ethylenediamine, N-(2-hydroxyethyl) ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, or a mixture of two or more thereof.

The fatty amide may comprise stearamide, oleamide, linoleamide, linolenamide, or a mixture of two or more thereof. The fatty amide may comprise one or more alkylenebisfattyamides, such as ethylenebistearamide, ethylenebisoleamide, ethylenebislinoleamide, or a mixture of two or more thereof.

The fatty alcohols may comprise one or more saturated fatty alcohols, one or more unsaturated fatty alcohols, or a mixture thereof. The saturated fatty alcohols may include octyl alcohol, decylalcohol, lauryl alcohol, myristyl alcohol, cetyl alcohol, stearyl alcohol, or a mixture of two or more thereof. The unsaturated fatty alcohols may include oleyl alcohol, linoleyl alcohol, linolenyl alcohol, or a mixture of two or more thereof.

The dispersant may comprise one or more polyalkylene glycols, polyoxyalkylene glycols, or a mixture thereof. Examples may include diethylene glycol, triethylene glycol, tetraethylene glycol, dipropylene glycol, tripropylene glycol, dibutylene glycol, tributylene glycol, as well as other alkylene glycols and polyoxyalkylene glycols in which the alkylene groups contain from 2 to about 8 carbon atoms. Mixtures of two or more of the foregoing may be used.

The dispersant may comprise one or more titanates, one or more zirconates, or a mixture thereof. The titanates and zirconates may comprise one or more organometallic complexes of titanium or zirconium complexed by one or more organic compounds containing functional groups attached to a hydrocarbon linkage. The organic compounds may contain one or more, and in one embodiment, two or more functional groups. The functional groups may comprise one or more of =O, =S, —OR, —SR, —NR$_2$, —NO$_2$, =NOR, =NSR and/or —N=NR, wherein R is hydrogen or a hydrocarbon group (e.g., alkyl or alkenyl of 1 to about 10 carbon atoms). The titanates and zirconates may include alkoxy titanates and coordinate zirconates. These may include the alkoxy titanates available under the tradenames LICA 12 or KR-PRO, from Kenrich Petrochemicals, Inc., Bayonne, N.J., and the coordinate zirconates available under the tradenames KZ 55 or KR 55, from Kenrich. These may be provided in liquid or powder form. The powder may be formed by sorbing liquid titanate or zirconate on inorganic particulates, such as fumed silica or aluminum oxide. For example, a titanate or zirconate powder may be prepared by drip blending two parts titanate or zirconate liquid on one part aluminum oxide particulates. The titanates may be thermally stable to 350° C. and the zirconates may be thermally stable to 400° C. The zirconates may be used with a phenol antioxidant, thermal stabilizer.

The dispersant may comprise one or more hydrocarbon dispersants, including natural or synthetic paraffins, polyethylene waxes, or mixtures of two or more thereof. The dispersant may comprise one or more fluorocarbons. The dispersant may comprise one or more silicone release agents such as one or more silicone oils.

The dispersant may comprise one or more surfactants. These may include ionic and/or non-ionic surfactants. The ionic surfactants may be cationic and/or anionic compounds. These compounds may have a hydrophilic lipophilic balance (HLB) up to about 20, and in one embodiment in the range from about 1 to about 20. The surfactants that may be used may include those disclosed in *McCutcheon's Emulsifiers and Detergents,* 1993, North American & International Edition. Examples may include alkanolamides, alkylarylsulphonates, amine oxides, poly(oxyalkylene) compounds, including block copolymers comprising alkylene oxide repeat units, carboxylated alcohol ethoxylates, ethoxylated alcohols, ethoxylated alkyl phenols, ethoxylated amines and amides, ethoxylated fatty acids, ethoxylated fatty esters and oils, fatty esters, glycerol esters, glycol esters, imidazoline derivatives, lecithin and derivatives, lignin and derivatives, monoglycerides and derivatives, olefin sulphonates, phosphate esters and derivatives, propoxylated and ethoxylated fatty acids or alcohols or alkyl phenols, sorbitan derivatives, sucrose esters and derivatives, sulphates or alcohols or ethoxylated alcohols or fatty esters, polyisobutylene succinicimide and derivatives, sulphonates of dodecyl and tridecyl benzenes or condensed naphthalenes or petroleum, sulphosuccinates and derivatives, tridecyl and dodecyl benzene sulphonic acids, and mixtures of two or more thereof.

The dispersant may also function as an internal lubricant, mold release, flow aid and/or processing aid. The dispersant may function as a dispersant for other additive materials in addition to the inorganic particulates. The dispersant may be hydrophobic. The dispersant may have a melt temperature in the range from about 50 to about 400° C., and in one embodiment from about 60 to about 375° C., and in one embodiment about 65° C. to about 350° C. The dispersant may be thermally stable at a temperature up to about 350° C., and in one embodiment up to about 400° C. or higher.

The dispersant may include INT-40DHT, which is a product that may be available from Axel Plastics Research Laboratories, Inc., Woodsie, N.Y. INT-40DHT. The product may be thermally stable up to about 400° C. INT-40DHT may be identified as a mixture of saturated and unsaturated fatty esters with modified organic derivatives. INT-40 DHT may be identified as a mixture of one or more fatty acids, fatty esters and glycerides.

The dispersant may be INT-33UDY or INT-33UDS from Axel Plastics. These may be identified as a mixture of one or more fatty amides and one or more surfactants. INT 33UDY may be thermally stable up to about 350° C., and INT-33UDS may be stable up to about 400° C.

The hydrolysis agent may be used to enhance the hydrolytic stability of the molded articles made from the polymer composition when the molded articles are subjected to heat and humidity and when subjected to high temperatures in solder reflow processes, particularly lead free solder reflow processes. The hydrolysis agent may comprise a polymeric carbodiimide or one or more calcined aluminum oxides. The aluminum oxides may comprise a gamma, delta, delta-theta, or alpha phase aluminum oxide, or a mixture of two or more thereof. The hydrolysis agent may be thermally stable to about 350° C. or higher. Carbodiimide may not absorb water. It may react to form urea groups. Every mole of N═C═N may react with a mole of water. A carbodiimide hydrolysis agent that may be used may be Stabaxol P 400, which has thermal stability up to about 350° C., and is available from Rhein Chemie Corp., Pittsburgh, Pa. A calcined aluminum hydrolysis agent that may be used may be Puralox K-160, which has a primary crystal particle size of about 5 nm and is thermally stable to about 350° C. or higher, and is available from Sasol Corp., Houston, Tex. While not wishing to be bound by theory, it is believed that calcined alumina oxide hydrolysis agent may scavenge moisture from the polymer composition and bind the absorbed water and prevent vaporization of the moisture when the polymer composition is exposed to lead free solder reflow temperatures exceeding about 260° C.

The bluing agent may be used to enhance the color quality of molded articles made from the polymer composition. The bluing agent may be used to offset yellow color formation in the polymer composition so as to optically clarify the polymer composition. The bluing agent may comprise at least one blue dye, or a mixture of at least one blue dye and at least one violet dye. The blue dye may be Amplast Blue R3 or Amplast Blue HB, which may be available from ColorChem International Corp. and are identified as being insoluble blue dyes in the form of a dry powder that melts at about 170° C. and is thermally stable at temperatures up to about 400° C. The violet dye may be Amplast Violet BV or Amplast Violet PK which may be available from ColorChem International Corp. and are identified as being unsoluble violet dyes in the form of dry powders that melt at about 170° C. and are thermally stable at temperatures up to about 400° C. The concentration of the bluing agent in the polymer composition may be in the range from about 0.05 to about 4 parts per million based on the weight of the polymer composition. The concentration of the bluing agent in the additive composition that may be used in making the polymer composition may be in the range from about 0.0005 to about 0.008% by weight based on the total weight of the additive composition, and in one embodiment from about 0.001 to about 0.004% by weight.

The bluing agent may be provided in the form of a dye concentrate which may comprise (i) at least one dispersant; (ii) at least one dye, and (iii) inorganic particulates having an average particle size in the range up to about 100 nm and an index of refraction in the range from about 1.4 to about 2.5. The dispersant, dye and inorganic particulates may be the same as described above. The specific dispersant and and/or inorganic particulates in the dye concentrate may be the same, or either or both may be different than the specific dispersant and inorganic particulates supplied to the polymer composition separately from the dye concentrate. As indicated above, the dye may be a blue dye, or a mixture of blue and violet dyes. The concentration of dispersant in the dye concentrate may be in the range from about 98.5 to about 99.8% by weight, and in one embodiment from about 99.0 to about 99.6% by weight. The concentration of the dye in the dye concentrate may be in the range from about 0.05 to about 0.8% by weight, and in one embodiment from about 0.2 to about 0.6% by weight. The concentration of the inorganic particles in the dye concentrate may be in the range from about 0.05 to about 1% by weight, and in one embodiment from about 0.1 to about 0.5% by weight. The dye concentrate may be in the form of a dry powder which may be thermally stable up to at least about 350° C., and in one embodiment up to at least about 400° C. The concentration of the dye concentrate in the polymer composition may be in the range from about 0.001 to about 0.01% by weight based on the total weight of the polymer composition, and in one embodiment from about 0.004 to about 0.008% by weight. The concentration of the dye concentrate in the additive composition that may be used in making the polymer composition may be in the range from about 0.5 to about 6% by weight based on the total weight of the additive composition, and in one embodiment from about 1 to about 4% by weight.

The dye concentrate may be made by mixing and optionally grinding the materials selected for use in the dye concentrate. An example of a dye concentrate which may be a homogenous, free-flowing, dry powder is shown in Table 1.

TABLE 1

| Material: | % by Weight of Total Dye Concentrate Formula: |
|---|---|
| (1) mixture of saturated and unsaturated fatty esters; or (2) mixture of organic fatty amides with surfactants; or a mixture of (1) and (2) | 98.4-99.7 |
| High temperature stable blue dye/dry powder | 0.05-0.3 |
| High temperature stable violet dye/dry powder | 0.05-0.3 |
| Inorganic particulate solids with average particle size <100 nm. | 0.05-1.0 |

In one embodiment, the dye concentrate may have a formula set forth in Table 2.

TABLE 2

| Material: | % by Weight of Total Dye Concentrate Formula: |
|---|---|
| (1) Mixture of saturated and unsaturated fatty esters; or (2) mixture of organic fatty amides with surfactants; or a mixture of both (1) and (2) | 99.4 |
| High temperature stable blue dye/dry powder | 0.2 |
| High temperature stable violet dye/dry powder | 0.2 |
| Inorganic particulates with average particle size <100 nm | 0.2 |

The dye concentrate may be made in the form of a homogenous paste. An example of a homogenous paste concentrate is shown in Table 3.

TABLE 3

| Material: | % by Weight of Total Dye Concentrate Formula: |
|---|---|
| Titanate or zirconate liquid | 98.4-99.7 |
| High temperature stable blue dye/dry powder | 0.05-0.3 |
| High temperature stable violet dye/dry powder | 0.05-0.3 |
| Inorganic particulate solids with average particle size <100 nm. | 0.1-1.0 |

In one embodiment, the dye concentrate may have the formula set forth in Table 4.

TABLE 4

| Material: | % by Weight of Total Dye Concentrate Formula: |
|---|---|
| Titanate or zirconate liquid | 99.4 |
| High temperature stable blue dye/dry powder | 0.2 |
| High temperature stable violet dye/dry powder | 0.2 |
| Inorganic particulates with average particle size <100 nm | 0.2 |

The ultraviolet (UV) light absorber may be used to provide hydrolytic and/or thermal stability to the polymer composition and/or long term hydrolytic, photolytic, and/or thermal stability to articles molded from the polymer composition. The UV light absorber may be referred to as a UV light stabilizer. The UV light absorber may be may be thermally stable up to a temperature of about 350° C., and in one embodiment up to about 400° C. or higher. In one embodiment the UV absorber may be thermally stable up to at least about 400° C. when combined with the fatty ester and inorganic particulates described above. Materials suitable for use as the UV light absorber may include tetraethyl 2,2' (1,4-phenylenedimethylidyne) bis malonate. A suitable material may be Hostavin® B-CAP which is available from Clariant Corporation, Charlotte, N.C. The UV absorber may comprise one or more substituted triazines, such as 2,4-bis(2,4-dimethylphenyl)-6-(2-hydroxy-4-n-octyloxyphenyl)-1,3,5-triazin e (CYA-SORB® UV-1164) or 2-(4,6-diphenyl-1,3,5-triazin-2-yl)-5-(hexyl)oxyphenol (Tinuvin® 1577). The UV absorber may comprise 2,2-methylenebis-(4-(1,1,3,3-tetramethylbutyl)-6-(2H-benzotriazol-2-yl)phenol). The UV absorber may comprise one or more benzophenone compounds such as 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydride benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone and/or 2-hydroxy-4-methoxy-2'-carboxybenzophenone. The UV absorber may comprise one or more benzotriazole compounds such as 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzooxazin-4-one) and/or 2-[2-hydroxy-3-(3,4,5,6-tetrahydrophthalimidomethyl)-5-methylphenyl] benzotriazole. The concentration of the UV light absorber in the polymer composition may be in the range from about 0.01 to about 0.2% by weight based on the total weight of the polymer composition, and in one embodiment from about 0.02 to about 0.1% by weight. The concentration of the UV light absorber in the additive composition that may be used in making the polymer composition may be in the range from about 3 to about 20% by weight based on the total weight of the additive composition, and in one embodiment from about 4 to about 10% by weight.

The antioxidant may comprise a high molecular weight, low volatility primary antioxidant and/or a high molecular weight, low volatility secondary antioxidant. The antioxidant may be suitable for substantially reducing or eliminating yellowing of the thermoplastic resin during processing. The primary antioxidant may be thermally stable up to about 350° C., and in one embodiment up to about 400° C. or greater. In one embodiment the primary antioxidant may be thermally stable up to about 400° C. or greater when combined with the fatty ester and inorganic particulates described above. The primary antioxidant may have a molecular weight in the range from about 550 to about 750.

The primary antioxidant may comprise one or more hindered phenols. These may include one or more of 1,3,5-tris (4-t-butyl-3-hydroxy-2,6-dimethylbenzyl) s-triazine-2,4,6-(1H,3H,5H)-trione; 4,4'-isopropylidene-diphenol; butylated hydroxyanisole; 1,3,5-trimethyl-2,4,6-tris(3,5-di-di-tert-butyl-4-hydroxybenzyl)benzene; 4,4'-methylene-bis(2,6-di-tert-butylphenol); 1,1,3-tris(2-methyl-4-hydroxy-5-tert-butylphenyl) butane; 2,6-di-tert-butyl-4-ethylphenol; bis-[3,3-bis-(4'-hydroxy-3'-tert-butyl-phenyl-butanoic acid]-glycol ester; 1,1,3-tris(2-methyl-4-hydroxy-5-tert-butyl-phenyl)butane; 4,4'-thio-bis(6-tert-butyl-m-cresol); 4,4-thio-bis(2-tert-butyl-m-cresol); 4,4'-butylidene-bis(2-tert-butyl-m-cresol); 2,6-di-tert-butyl-p-cresol; 2,6-di-tert-butyl-4-sec-butylphenol; 2,2'-methylene-bis(4-ethyl-6-tert-butylphenol); 1,3,5-(4-tert-butyl-3-hydroxy-2,6-d imethylbenzyl)-1,3,5-triazine-2,4,6-(1H,3H,5G)-trione; 2,2'-methylene-bis(4-methyl-6-tert-butylphenol); 1,6-hexamethylene-bis(3,5-d i-tert-butyl-4-hydroxyhydrocin namate); tetrakis {methylene-3-(3,5-di-tert-butyl-4-hydroxyphenyl)propionate}methane; octadecyl-3-(3'5-di-tert-butyl-4-hydroxyphenyl)propionate; 1,3,5-tris (3,5-di-tert-butyl-4-hydroxybenzyl)isocyanurate; 3,5-di-tert-butyl-4-hydroxyhydrocinnamic acid trimester, or mixtures of two or more thereof. A hindered phenol that may be used may be 1,3,5-tris(2-hydroxyethyl)-s-triazine-2,4,6-(1H,3H,5H)trione which may be available as Cyanox® 1790 from Cytec Industries, West Paterson, N.J.

The concentration of the primary antioxidant in the polymer composition may be in the range up to about 1% by weight, and in one embodiment from about 0.01 to about 1% by weight based on the total weight of the polymer composition, and in one embodiment from about 0.03 to about 0.07% by weight. The concentration of the primary antioxidant in the additive composition that may be used in making the polymer composition may be in the range up to about 10% by weight, and in one embodiment from about 1 to about 10% by weight based on the total weight of the additive composition, and in one embodiment from about 3 to about 7% by weight.

The secondary antioxidant may be used to reduce yellowing of the polymer composition during high temperature processing. The secondary antioxidant may also provide hydrolytic and/or thermal stability to the polymer composition during processing. The secondary antioxidant may provide long term hydrolytic, photolytic, and/or thermal stability to molded articles formed from the polymer composition. The secondary antioxidant may be thermally stable up to a temperature of at least about 350° C., and in one embodiment up to at least about 400° C. In one embodiment, the secondary antioxidant may be thermally stable up to at least about 400° C. when combined with at least one fatty ester and inorganic particulates as discussed above.

The secondary antioxidant may comprise at least one phosphite. The secondary antioxidant may comprise one or more of bis(aralkylphenyl) pentaerythritol diphosphite, bis(2,4-dicumylphenyl)pentaerythritol diphosphite, distearylpentaerythritol diphosphite, dioctylpentaerythritol diphosphite, diphenylpentaerythritol diphosphite, bis(2,4-di-tert-butylphenyl)pentaerythritol diphosphite, bis(2,6-di-tert-butyl-4-methylphenyl)pentaerythritol diphosphite, dicyclohexylpentaerythritol diphosphite, or a mixture of two or more thereof.

A useful secondary antioxidant may be bis(2,4-dicumylphenyl)pentaerythritol diphosphite available as Doverphos® S-9228PC from Dover Chemical Corporation, Dover, Ohio. Doverphos S-9228PC may be advantageous for use with polycarbonates due to the fact it has a maximum sodium content of about 200 parts per million, which may be effective for enhancing optical clarity and/or avoiding leaching of sodium from the molded article. This material may have a melting point of about 220° C. or higher. This material exhibits good hydrolytic stability, and may be thermally stable at temperatures up to about 400° C.

The concentration of the secondary antioxidant in the polymer composition may be in the range up to about 0.4% by weight, and in one embodiment from about 0.01 to about 0.4% by weight based on the total weight of the polymer composition, and in one embodiment from about 0.05 to about 0.25% by weight. The concentration of the secondary antioxidant in the additive composition that may be used in making the polymer composition may be in the range up to about 50% by weight, and in one embodiment from about 3 to about 50% by weight based on the total weight of the additive composition, and in one embodiment from about 10 to about 40% by weight.

The antistatic agent may comprise one or more of polyetherestearmide, glycerin monostearate, dodecylbenzenesulfonic acid ammonium salt, dodecylbenzesulfonic acid phosphonium salt, maleic anhydride monoglyceride, maleic anhydride diglyceride, carbon, graphite and/or a metal powder. The concentration of the antistatic agent in the polymer composition may be in the range from about 0.02 to about 1% by weight based on the total weight of the polymer composition, and in one embodiment from about 0.05 to about 0.5% by weight. The concentration of the antistatic agent in the additive composition that may be used in making the polymer composition may be in the range from about 0.05 to about 20% by weight based on the total weight of the additive composition, and in one embodiment from about 1 to about 10% by weight.

The heat stabilizer may comprise one or more of phosphorous acid, phosphoric acid, esters of these, and/or condensates of these. Examples of these may include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyidiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis (nonylphenyl)pentaerythritol diphosphite, bis(2,4-di-tert-butylphenyl)pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate and/or triphosphoric acid. These compounds may be used alone or in combination of two or more. The concentration of the heat stabilizer in the polymer composition may be in the range up to about 0.5% by weight based on the total weight of the polymer composition, and in one embodiment from about 0.001 to about 0.5% by weight. The concentration of the heat stabilizer in the additive composition that may be used in making the polymer composition may be in the range up to about 30% by weight based on the total weight of the additive composition, and in one embodiment from about 3 to about 30% by weight.

The polymer composition may further comprise one or more melt processable glass reinforcing resins or materials. The melt processable glass reinforcing resin may comprise at least one phosphate glass. The melt processable glass reinforcing resin may have a Tg in the range from about 220° C. to about 400° C. The melt processable glass reinforcing resin may be present in the polymer composition at a concentration in the range up to about 90% by weight based on the weight of the polymer composition, and in one embodiment from about 0.25 to about 90% by weight, and in one embodiment in the range from about 0.5 to about 20% by weight, and in one embodiment from about 10 to about 50% by weight. The melt processable glass reinforcing resin may be present in the polymer composition at a concentration in the range up to about 40% by volume based on the volume of the polymer composition, and in one embodiment from about 0.1 to about 40% by volume, and in one embodiment from about 4.5 to about 25% by volume. Without being bound to any particular theory, it is believed that the melt processable glass reinforcing resins or materials may provide the polycarbonate resin with enhanced protection from degradation caused by heat and shear during compounding and when used at a concentration, for example, in the range from about 0.5 to about 20% by weight, may exhibit improved interfacial bonding with the polycarbonate resin. Without being bound to any particular theory, it is believed that the melt processable glass reinforcing resin may provide the polymer composition with a higher Tg than the Tg of the polymer composition without the glass reinforcing resin. The melt processable glass reinforcing resin may increase the temperature resistance, stiffness and/or modulus of the polymer composition. The glass reinforcing resin may reduce the shrinkage of the polymer composition upon cooling in the mold. The glass reinforcing resin may make the molded articles formed from the polymer composition more abrasion resistant. A suitable melt processable glass reinforcing resin is 908YRL, which is a phosphate glass available from Corning. This material may have a Tg of about 309° C. and a refractive index of about 1.55-1.57. This material can be sized from about 5 nm to about 30 microns, with sub micron sizes being advantageously useful. Other phosphate glasses that may be useful are described in U.S. Pat. No. 6,667,258 B2 and U.S. Pat. No. 5,153,151, which are incorporated herein by reference for their disclosures of phosphate glasses. While it may be desirable to match, as closely as possible, the refractive indexes of the polymer and the phosphate glass, it may also be desirable to use a phosphate glass having a higher refractive index than that of the polymer composition in order to increase the overall refractive index of the polymer composition.

The glass reinforcing resin may be silane treated to enhance dispersion of the glass reinforcing resin into the polymer and to optionally couple the glass reinforcing resin to the polymer resin system. Examples of silanes that may be used may include Dynasylan DAMO and/or Dynasylan 9165 which are discussed above. Blends of Dynasylan DAMO and Dynasylan 9165 may be used.

The glass reinforcing resin may be surface treated with one or more titanates, one or more zirconates, or a mixture thereof. The titanates and zirconates may comprise one or more organometallic complexes of titanium or zirconium complexed by one or more organic compounds containing functional groups attached to a hydrocarbon linkage. The organic compounds may contain one or more, and in one embodiment, two or more functional groups. The functional groups may comprise one or more of =O, =S, —OR, —SR, —NR$_2$, —NO$_2$, =NOR, =NSR and/or —N=NR, wherein R is hydrogen or a hydrocarbon group (e.g., alkyl or alkenyl) of 1 to about 10 carbon atoms. The titanates and zirconates may include alkoxy titanates and coordinate zirconates. These may include the alkoxy titanates available under the tradenames LICA 12 or KR-PRO, and coordinate zirconates available under the tradenames KZ 55 or KR 55.

The polymer composition may further comprise one or more pigments, dyes, optical brighteners, flame retardants, or a mixture of two or more thereof. The concentration of each of these additional additives in the polymer composition may be in the range up to about 1% by weight based on the total weight of the polymer composition, and in one embodiment from about 0.01 to about 0.5% by weight. The concentration of each of these additional additives in the additive composition that may be used in making the polymer composition may be in the range up to about 30% by weight based on the total weight of the additive composition, and in one embodiment from about 1 to about 20% by weight.

The polymer composition may be made by combining the thermoplastic resin with the additive composition. The melt processable glass reinforcing resin may be initially combined with the thermoplastic resin and/or the additive composition. The additive composition may comprise the dispersant, inorganic particulates and dye concentrate, as described above. The additive composition may further comprise one or more antioxidants, UV light stabilizers, heat stabilizers, antihydrolysis agents, biphenol compounds, antistatic agents, pigments, additional dyes, optical brighteners, flame retardants, melt processable glass reinforcing resins, or a mixture of two or more. The additive composition may be present in the polymer composition in an amount of at least about 0.1% by weight of the total weight of the polymer composition, and in one embodiment from about 0.1 to about 3% by weight, and in one embodiment from about 0.3 to about 2% by weight.

The additive composition may be in the form of a paste or a dry powder. In one embodiment, the additive composition may comprise a homogenous, free-flowing, dry powder. The additive composition may be capable of acting as an internal lubricant or processing aid by increasing the flow and/or decreasing the shear of the polymer composition. This may allow for shorter production cycle times for producing molded products such as, for example, optical lenses, reduce the processing temperature of the polymer composition. This may allow for precision molding of details to less than about one micron on a molded product such as an optical lens. The additive composition may have excellent dispersion properties to allow for homogenous dispersion of inorganic particulates (e.g., nanoparticles) and/or antioxidants as well as other additives in the polymer composition or molded articles made therefrom. The additive composition may be hydrolytically stable, which may provide for improved aging of articles molded in humid environments. The additive composition may also have a relatively high optical clarity, which contributes to retaining and improving optical clarity and light transmission of molded articles made from the polymer composition. Additionally, it may be desirable that the additive composition has no adverse affect on secondary operations such as, for example, printing, bonding, and/or coating molded articles made from polymer compositions containing the additive composition. The additive composition may be non-yellowing and provide resistance to yellowing of molded products that are exposed to high temperatures and/or high humidity.

The additive composition may be thermally stable up to about 350° C., and in one embodiment, up to about 400° C. or higher. This allows for processing of a thermoplastic resin and the additive composition at temperatures up to about 350° C., and in one embodiment up to about 400° C. This thermal stability may also improve the thermal aging of the polymer composition and molded articles made therefrom.

In one embodiment, the additive composition may be a homogenous, free-flowing, dry-power additive composition having the formula shown in Table 5.

TABLE 5

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Dye concentrate/dry powder | 0.05-4 |
| Inorganic particulates with average particle size <100 nm/dry powder | 0.5-30 |
| High molecular weight, low volatility primary antioxidant | 0-30 |
| High molecular weight, low volatility secondary antioxidant | 5-50 |

TABLE 5-continued

| Material: | % by Weight of Total Additive Composition: |
|---|---|
| Thermally stable antihydrolysis agent | 0-3 |
| Biphenol | 0-5 |
| UV (ultra-violet) Light Stabilizer | 0-30 |

Examples of non-limiting embodiments of suitable additive compositions are shown in Tables 6-9. The additive composition in Table 6 may be suitable for use in making, for example, high temperature, optically clear thermoplastic composites for use in applications, such as camera lenses, where the lens is capable of surviving lead free solder reflow processing temperatures.

TABLE 6

| Material: | % by Weight of Total Additive Composition: |
|---|---|
| (1) Mixture of saturated and unsaturated fatty esters; or (2) mixture of organic fatty amides with surfactants; or a mixture of (1) and (2) | 82.98 |
| Dye concentrate/dry powder | 2.0 |
| Inorganic particulates with average particle size <100 nm | 0.86 |
| High molecular weight, low volatility primary antioxidant | 14.16 |
| Total | 100 |

The additive composition in Table 7 may be suitable for use in making, for example, polymer compositions that may be used to make high temperature, optically clear molded articles that have enhanced thermal oxidative and hydrolytic oxidative resistance. Suitable applications may include camera lenses and LED's, where the lens is capable of surviving lead free solder reflow processing temperatures, is used at high operating temperatures greater than about 85° C., is simultaneously subjected to a relative humidity greater than about 60%, and is subjected to intense transmission of narrow, short wavelength light bands (for example, 450 nm).

TABLE 7

| Material: | % by Weight of Total Additive Composition: |
|---|---|
| (1) Mixture of saturated and unsaturated fatty esters; or (2) mixture of organic fatty amides with surfactants; or a mixture of both (1) and (2) | 52 |
| Dye concentrate/dry powder | 2 |
| Inorganic particulates with average particle size <100 nm | 6 |
| High molecular weight, low volatility primary antioxidant | 8 |
| High molecular weight, low volatility secondary antioxidant | 32 |
| Total | 100 |

The additive composition in Table 8 may be suitable for use in making, for example, polymer compositions that may be used to make high temperature, optically clear thermoplastic composites that have enhanced thermal oxidative, hydrolytic oxidative resistance, and photolytic oxidative resistance. Suitable applications may include camera lenses and LED's, where the lens is capable of surviving lead free solder reflow processing temperatures, is used at high operating temperatures greater than about 85° C., is simultaneously subjected to a relative humidity greater than about 60%, is subjected to intense transmission of narrow, short wavelength light bands (for example, 450 nm), and is subjected to incidental sunlight.

TABLE 8

| Material: | % by Weight of Total Additive Composition: |
|---|---|
| (1) Mixture of saturated and unsaturated fatty esters; or (2) mixture of organic fatty amides with surfactants; or a mixture of both (1) and (2) | 50.6 |
| Dye Concentrate/dry powder | 2 |
| Inorganic particulates with average particle size <100 nm | 6 |
| High molecular weight, low volatility primary antioxidant | 6 |
| High molecular weight, low volatility secondary antioxidant | 27.4 |
| UV (ultra-violet) Light Stabilizer | 8 |
| Total | 100 |

The additive composition in Table 9 may be suitable for use in making, for example, polymer compositions that may be used to make high temperature, optically clear thermoplastic composites that have enhanced thermal oxidative resistance, hydrolytic oxidative resistance, and photolytic oxidative resistance. Suitable applications may include camera lenses and LED's, where the lens is capable of surviving lead free solder reflow processing temperatures, is used at high operating temperatures greater than about 85° C., is simultaneously subjected to a relative humidity greater than about 60% prior to lead free solder reflow processing and following lead free solder reflow processing, is subjected to intense transmission of narrow, short wavelength light bands (for example, 450 nm), and is subjected to incidental sunlight.

TABLE 9

| Material: | % by Weight of Total Additive Composition: |
|---|---|
| (1) Mixture of saturated and unsaturated fatty esters; or (2) mixture of organic fatty amides with surfactants; or a mixture of both (1) and (2) | 50.6 |
| Dye Concentrate/dry powder | 1 |
| Inorganic particulates with average particle size <100 nm | 6 |
| Antihydrolysis agent: (1) polymeric carbodiimide; or (2) calcined alumina oxide particulates; or a mixture of (1) and (2) | 12 |
| High molecular weight, low volatility secondary antioxidant | 24.4 |
| UV (ultra-violet) Light Stabilizer | 6 |
| Total | 100 |

The additive composition that may be used to make the polymer composition may be thermally stable up to a temperature of about 400° C. or greater. This additive composition may include at least one fatty ester, at least one fatty amide, or a mixture thereof, that are thermally stable up to about 400° C. or greater, and a dye concentrate that is thermally stable up to about 400° C. or greater. This additive composition may include one or more of blue dye, violet dye, inorganic particulates, antihydrolysis agent, biphenol, primary antioxidant, secondary antioxidant, and/or UV light stabilizer, each of which may be thermally stable up to about 400° C. or higher.

In one embodiment for producing an injection moldable, ultra-high temperature optical thermoplastic with a suitable viscosity for injection molding at temperatures up to about 400° C., an additive composition comprising the following ingredients may be used:

(a) at least about 40% by weight, of the total weight of the additive composition of a dispersant, the dispersant comprising (1) a mixture of saturated and unsaturated fatty esters; or (2) mixture of organic fatty amides with surfactants; or (3) mixture of polyhedral oligomeric silsesquioxanes; or a mixture of (1) and (2) and (3). (or (1) or (2) or (3).

(b) at least about 0.005% by weight of the total weight of the additive composition of a mixture of high temperature stable blue and violet organic dyes, which may be in the form of a dye concentrate comprising (i) at least about 96% by weight of the total weight of dye concentrate of (1) a mixture of saturated and unsaturated fatty esters, or (2) a mixture of organic fatty amides with surfactants, or a mixture of both (1) and (2); (ii) at least about 0.05% by weight of the total weight of the dye concentrate composition of a mixture of high temperature stable blue and violet organic dyes, and (iii) at least about 0.1% by weight of the total weight of the dye concentrate of high temperature stable, transparent, inorganic particulates having an average particle size less than about 100 nanometers, and in one embodiment less than about 50 nanometers, the inorganic particulates having an index of refraction of about 1.4-1.8, and in one embodiment an index of refraction of about 1.52-1.58;

(c) up to about 30% by weight, of the total weight of the additive composition of a primary antioxidant, which may be in the form of a high molecular weight, low volatility hindered phenol;

(d) at least about 10% by weight of the total weight of the additive composition of a secondary antioxidant, and in one embodiment from about 25 to about 40% by weight of the total weight of the additive composition, the secondary antioxidant being in the form of a high molecular weight, low volatility phosphite having a melting temperature greater than about 200° C.;

(e) at least about 0.05% by weight of the total weight of the additive composition of high temperature stable, transparent, inorganic particulates having an average particle size less than about 100 nm, and in one embodiment less than about 50 nm, the particulates having an index of refraction of about 1.54-1.58;

(f) at least about 2% by weight of a UV light stabilizer;

(g) up to about 50% by weight of the total weight of the additive composition of a antihydrolysis agent, and in one embodiment from about 25 to 50% by weight of the total weight of the additive composition, the antihydrolysis agent being in the form a polymeric carbodiimide or calcined aluminum oxide particles having a thermal stability of about 350° C. or higher; and (h) up to about 50% by weight of the total weight of the additive composition of a biphenol compound, and in one embodiment from about 25 to 50% by weight of the total weight of the additive composition of a biphenol compound such as 4,4' biphenol.

The additive composition may be made by (1) mixing the dye concentrate (b) with the dispersant (a), and then (2) mixing, and optionally grinding, the resultant mixture from (1) with the inorganic particulates (e), and, optionally, with the primary antioxidant (c), secondary antioxidant (d), and/or UV light stabilizer (f), and/or the antihydrolysis agent (g), and/or the biphenol compound (h).

In one embodiment for producing an injection moldable, ultra-high temperature optical thermoplastic with a suitable viscosity for injection molding at temperatures up to about 400° C., an additive composition comprising the following ingredients may be used:

(a) at least about 40% by weight, of the total weight of the additive composition, of at least one zirconate;

(b) at least about 0.005% by weight of the total weight of the additive composition of a mixture of high temperature stable blue and violet organic dyes, which may be in the form of a dye concentrate comprising (i) at least about 96% by weight of the total weight of dye concentrate of a zirconate, (ii) at least about 0.05% by weight of the total weight of the dye concentrate of a mixture of high temperature stable blue and violet organic dyes, and (iii) at least about 0.1% by weight of the total weight of the dye concentrate of high temperature stable, transparent, inorganic particulates having an average particle size less than about 100 nanometers, and in one embodiment less than about 50 nanometers, the inorganic particulates having an index of refraction of about 1.4-1.8, and in one embodiment an index of refraction of about 1.52-1.58;

(c) up to about 30% by weight, of the total weight of the additive composition of a primary antioxidant, which may be in the form of a high molecular weight, low volatility hindered phenol;

(d) at least about 10% by weight of the total weight of the additive composition of a secondary antioxidant, and in one embodiment about 25-40% by weight of the total weight of the additive composition, the secondary antioxidant being in the form of a high molecular weight, low volatility phosphite having a melting temperature greater than about 200° C.;

(e) at least about 0.05% by weight of the total weight of the additive composition of high temperature stable, transparent, inorganic particulates having an average particle size less than about 100 nm, and in one embodiment less than about 50 nm, the particulates having an index of refraction of about 1.54-1.58;

(f) at least about 2% by weight of a UV light stabilizer.

(g) up to about 50% by weight of the total weight of the additive composition of a antihydrolysis agent, and in one embodiment from about 25 to 50% by weight of the total weight of the additive composition, the antihydrolysis agent being in the form a polymeric carbodiimide or calcined aluminum oxide particles having a thermal stability of about 350° C. or higher;

(h) up to about 50% by weight of the total weight of the additive composition of a biphenol compound, and in one embodiment from about 25 to 50% by weight of the total weight of the additive composition of a biphenol compound such as 4,4' biphenol.

The additive composition may be made by (1) mixing the dye concentrate (b) with the zirconate (a), and then (2) mixing, the resultant mixture from (1) with the inorganic particulates (e), and, optionally, with the primary antioxidant (c), secondary antioxidant (d), and/or UV light stabilizer (f).

It may be desirable that the additives, when processed with the thermoplastic resin, not yellow or degrade when subjected to process temperatures of about 300° C. to about 400° C., while providing other useful features and benefits to the molded articles, for example, optical lenses. Without being bound to any particular theory, the additive composition may possess one or more of the characteristics and provide one or more of the benefits listed in Table 10.

TABLE 10

| Features: | Benefits: |
|---|---|
| Internal lubricant & processing aid | Increases flow, decreases shear of the ultra-high temperature polymer composition; shortens production cycle times for producing optical lenses; reduces processing temperature of the polymer composition; allows for precision molding of details on optical lenses to less than one micron. |
| Excellent dispersion qualities | Allows for homogeneous dispersion of nano-particles & organic anti-oxidants in the ultra-high temperature, optical plastic and optical plastic lenses. |
| Hydrolytically stable | Improves aging of molded plastic lenses in humid environments |
| Thermally stable up to 400° C. | The additives and the polymer composition may be processed at temperatures up to about 400° C.; Improves thermal aging of the polymer composition during molding and after molding. The additive composition may be essentially non-yellowing during molding operations. The molded, optical lenses may have good resistance to yellowing when exposed to high temperatures and high humidity. |
| Optical Clarity | Retains and improves optical clarity and light transmission of the molded articles, e.g., ultra-high temperature, optical plastic lenses. |
| Secondary operations | Causes no adverse effect on secondary operations such as printing, bonding, & coating of the molded, optical plastic lenses. |

In one embodiment, the polymer composition may be an ultra-high temperature, optical thermoplastic comprising a high temperature thermoplastic resin and an additive composition that is thermally stable up to about 400° C. or higher. An injection moldable, ultra-high temperature optical polymer material with a suitable viscosity for injection molding at temperatures up to about 400° C. and which may be used to make a high temperature resistant, optical plastic lens articles having one or more characteristics identified in Table 14 may be provided by:

(1) Providing an appropriate thermoplastic resin, in the form of pellets, in an amount of at least about 88% by weight of the total weight of the polymer composition.

(2) Providing at least about 0.2 by weight of the total weight of the polymer composition of an additive composition such as, for example, the additive composition disclosed in Table 5.

(3) Heating the thermoplastic resin pellets, to at least about 100° C., and in one embodiment to at least about 145° C., and drying the pellets to a moisture content less than about 0.01% by weight of the total weight of the pellets.

(4) Introducing at least about 0.2% by weight, and in one embodiment from about 0.5 to about 1.2%, of the total weight of the thermoplastic resin pellets, of the dry powder additive composition of Table 5 onto the heated pellets and tumble blending the additive composition onto the heated pellets, causing the additive composition to melt onto or surround the heated pellets and coat the pellets with the additive composition, and when cooled, resulting in the thermoplastic resin pellets being substantially uniformly coated with a an additive composition.

The resulting polymer composition may be further described with reference to Table 11.

TABLE 11

| Material: | % by Weight of Total Thermoplastic Composition: |
|---|---|
| (1) Mixture of saturated and unsaturated fatty esters; (2) mixture of organic fatty amides with surfactants; or (3) mixture of polyhedral oligomeric silsesquioxanes; or (4) zirconates; or a mixture of (1), (2), (3), and/or (4) | 0.2-7.0 |
| Dye Concentrate | 0.003-0.08 |
| Inorganic particulates with average particle size <100 nm | 0.0001-5.0 |
| High molecular weight, low volatility primary antioxidant | 0-0.2 |
| High molecular weight, low volatility secondary antioxidant | 0.05-0.3 |
| UV (ultraviolet light) stabilizer | 0-0.15 |
| Antihydrolysis agent | 0-3 |
| Biphenol | 0-2 |
| Phenyltrimethoxysilane (e.g., Dynasylan 9165), alone or in combination with diaminotrimethoxysilane (e.g., Dynasylan DAMO) | 0.1-5.0 |
| Polycarbonate resin, APEC ® TP-0277 | 88.0-99.75 |

The inventive polymer compositions may be capable of withstanding processing temperatures of up to about 400° C., and in one embodiment from about 300° C. to about 400° C. These may be suitable for making high temperature optical lens articles having one or more desirable characteristics, such as those listed in Table 14. Also, there may be different types of injection molding machines, methods of injection molding, and mold designs that may be used to mold both simple and complex lens articles using these polymer compositions. Additionally, these polymer compositions may be suitable for making high temperature resistant films by extrusion methods and solvent casting methods. The polymer composition may be useful in making versatile products of high temperature resistance that may be optically clear using various injection molding processes, with varying mold designs, and for producing plastic optical lens articles with varying designs, varying applications, and varying optical an physical properties. Examples of suitable, non-limiting, materials for these purposes are disclosed in Table 12 below.

TABLE 12

| Material Type & Description: | Example/Function/Source: |
| --- | --- |
| 1. Mixture of saturated and unsaturated fatty esters; mixture of fatty acids, esters & gycerides | INT-40DHT; Axel Plastic Research Laboratories, Inc., Woodside, NY; dry powder; internal lubricant, process aid, dispersant for inorganic particulates (e.g., nanomaterials) and other additive materials; hydrophobic; internal mold release; no adverse effect on mechanical properties or secondary operations such as surface coating of the thermoplastic resin; melts @ about 65° C.; thermally stable to about 400° C. |
| 2. Mixture of organic fatty amides and surfactants | INT-33 UDY; Axel Plastic Research Laboratories, Inc., Woodside, NY; dry powder; internal lubricant, process aid, mold release agent; dispersant for inorganic particulates (e.g., nanomaterials) and other additive materials; hydrophobic; no adverse effect on mechanical properties or secondary operations such as surface coatings of the thermoplastic resin; melts @ about 145° C.; thermally stable to about 350° C.; or, alternatively, INT-33 UDS; Axel Plastic Research Laboratories, Inc., Woodside, NY; dry powder; internal lubricant, process aid, mold release agent; dispersant for inorganic particulates (e.g., nanoparticles) and other additive materials; hydrophobic; no adverse effect on mechanical properties or secondary operations such as surface coatings of the thermoplastic resin; melts @ about 145° C.; thermally stable to about 400° C. |
| 3. Titanates and/or zirconates | Titanates and/or zirconate. Alkoxy titanate such as LICA 12 or KR-PRO, from Kenrich Petrochemicals, Inc., Bayonne, NJ, and/or coordinate zirconates such as KZ 55 or KR 55, from Kenrich (KEN-REACT Reference Manual, February, 1985, Kenrich Petrochemicals, Inc.), in liquid or powder form. To create a powder, the liquid titanate or zirconate may be absorbed or adsorbed onto inorganic particulates (e.g., fumed silica or aluminum oxide), in suitable consistency. The titanates LICA 12 or KR-PRO may be thermally stable up to about 350° C. or higher in a polymer matrix. The zirconates KZ-55 or KR 55 may be thermally stable up to about 400° C. in a polymer matrix. The titanates may be internal lubricant, process aid, dispersant and/or coupling agent for inorganic particulates (e.g., nanoparticles) and other additive materials. The titanates and/or zirconates may be hydrophobic. |
| 4. Polyhedral Oligomeric Silsesquioxane | POSS SO1458, tri silanol phenyl poss dry powder; Hybrid Plastics, Hattiesburb, MS, nternal lubricant, process aid, mold release agent; dispersant for inorganic particulates (e.g., nanomaterials) and other additive materials; hydrophobic; no adverse effect on mechanical properties or secondary operations such as surface coatings of the thermoplastic resin; melts @ about 145° C.; thermally stable to about 390° C. or higher. |
| 5. Hydrolysis Agent | The hydrolysis agent may comprise at least one polymeric cardiimide or at least one calcined aluminum oxide, (gamma, delta, delta-theta, or alpha phase), or a mixture of the two. The cardioomide hydrolysis agent may be Stabaxol P 400 having a thermal stability up to about 350° C. available from Rhein Chemie Corp., Pittsburgh, PA. The calcined aluminum hydrolysis agent may be Puralox K-160, having a primary, crystal particle size of about 5 nm, available from Sasol Corp., Houston, TX. These may enhance hydrolytic stability and prevent moisture vaporization under high heat. |
| 6. Dye Concentrate/dry powder | HTLT Dye Concentrate; Suncolor Corporation; melts @ 125° C.; thermally stable to over 400° C.; provides consistent, uniform color quality correcting yellow color formation in the host thermoplastic resin; optically clarifying the thermoplastic resin. |
| 6a. High temperature stable blue dye/dry powder | Amplast Blue R3 or Amplast Blue HB; ColorChem International Corp., Atlanta, GA, insoluble blue dye; melts @ 170° C.; thermally stable to 400° C. particularly when combined with a mixture of saturated and unsaturated fatty esters or amides/dry powder and high temperature resistant, inorganic particulates (e.g., nanomaterials). |

TABLE 12-continued

| Material Type & Description: | Example/Function/Source: |
| --- | --- |
| 6b. High temperature stable violet dye/dry powder | Amplast Violet BV or Amplast Violet PK; ColorChem International Corp., Atlanta, GA, insoluble violet dye; melts @ 170° C.; thermally stable to 400° C. particularly when combined with a mixture of saturated and unsaturated fatty esters or amides/dry powder and high temperature resistant, inorganic particulates (e.g., nanomaterials). |
| 7. Inorganic particulates with average particle size <100 nm/dry powder | Aluminum Oxide C or AEROXIDE Alu US; Degussa Corporation, Piscataway, NJ; calcined alumina oxide, gamma phase, Puralox K160, Sasol Corp., Houston, TX; average primary particle size less than about 100 nm, and in one embodiment less than about 50 nm; dry powder dispersant and suspension aid; flow aid for thermoplastics; high temperature resistance in excess of 1000° C.; aids in the uniform dispersion of visible light; moisture scavenger. |
| 8. High molecular weight, low volatility primary antioxidant | Cyanox 1790; Cytec Industries, West Paterson, NJ; primary hindered phenolic stabilizer (1,3,5-Tris(4-t-butyl-3-hydroxy-2,6-dimethylbenzyl) s-triazine-2,4,6-(1H,3H,5H)-trione); melts @ 160° C.; thermally stable to 400° C. when combined with a mixture of saturated and unsaturated fatty esters or amides/dry powder and high temperature resistant, inorganic particulates (e.g., nanomaterials); reduces or eliminates yellowing of the thermoplastic resin during high temperature processing. |
| 9. High molecular weight, low volatility secondary antioxidant | Doverphos S-9228PC; Dover Chemical Corporation, Dover, OH; solid phosphite antioxidant (Bis (2,4-dicumylphenyl) pentaerythrithol diphosphite); thermally stable to 400° C. when combined with a mixture of saturated and unsaturated fatty esters or amides/dry powder and high temperature resistant, inorganic particulates (e.g., nanomaterials); reduces yellowing of the thermoplastic resin during high temperature processing; melts @ 220-233° C.; provides hydrolytic and thermal stability to the thermoplastic resin and other thermoplastic materials in the additive composition during processing of the thermoplastic resin and provides long term hydrolytic, photolytic, and thermal stability to the molded articles. |
| 10. UV (ultra-violet) Light Stabilizer | Hostavin B-CAP; Clariant Corporation, Charlotte, NC; solid Benzylidene Malonate UV Absorber (Tetraethyl 2,2' (1,4-Phenylenedimethylidyne)Bis Malonate); thermally stable to 400° C., for short temperature cycles when combined with thermogravically stable mixture of saturated and unsaturated fatty esters, fatty acids, fatty amides, and high temperature resistant, inorganic nanomaterials; melts @ 137-140° C.; provides hydrolytic and thermal stability to the thermoplastic resin and other thermoplastic materials in the additive composition during processing of the polymer composition and provides long term hydrolytic, photolytic, and thermal stability to the molded articles. |
| 11. Polycarbonate resin | APEC ® TP 0277 or Apec 9399; Bayer Material Science LLC, Pittsburgh, PA; transparent, high temperature polycarbonate made from Bisphenol A, and/or Bisphenol M, and Bisphenol TMC, having a Tg of about 225° C. or higher. |
| 12. Biphenol | 4,4' BIPHENOL, Schenectady International, Schenectady, NY 12301; having a melt temperature greater than 200° C.; as an additive to moderate or increase the refractive index of the thermoplastic resin (e.g., polycarbonate). The biphenol may be used alone or with a compatible catalyst to increase the Tg of the thermoplastic resin. The biphenol may improve the UV light and short visible light resistance of the thermoplastic resin. |
| 13. Other inorganic particulates | Silicon dioxide, silicon, cerium oxide, titanium dioxide, zirconium oxide, and mixtures thereof; mixtures of one or more of the foregoing with aluminum oxide; either as a dry powder or in a solvent suspension (e.g., suspension in toluene); used as a reinforcing agent, dispersing agent, and/or an agent to increase the refractive index and to increase the temperature resistance of the polymer composition. These may be available from Degussa Corporation, Piscataway, NJ and Melorium Technologies, Inc., Rochester, NY. |

TABLE 12-continued

| Material Type & Description: | Example/Function/Source: |
|---|---|
| 14. Melt processable glass resin | Phosphate glass which may provide the polymer composition with a higher Tg than the Tg of the polymer composition without the phosphate glass and may increase the the temperature resistance, stiffness and modulus of the polymer composition while reducing the shrinkage of the polymer composition upon cooling in the mold and making the molded polymer composition more abrasion resistant. A suitable phosphate glass may be 908YRL, having a Tg of about 309° and a refractive index of about 1.55-1.57, which may be available from Corning. Other suitable phosphate glass compositions are described in U.S. Pat. No. 6,667,258 B2 and U.S. Pat. No. 5,153,151. While it is desirable to match, as closely as possible, the refractive indexes of the polymer and the phosphate glass, it may also be desirable to use a phosphate glass having a higher refractive index than the polymer composition in order to increase the overall refractive index of the polymer composition. |
| 15. Silanes, surface treatments and coupling agents | Silane surface treatments such as Dynasylan OCTEO (octyltriethoxysilane) and surface treatments and fuctional coupling agents such as Dynasil 9165 (phenyltrimethoxysilane), Dynasil DAMO (N-2-Aminoethyl-3-aminopropyltrimethoxysilane), or mixtures thereof, available from Degussa Corporation, Parsipany, NJ, having high temperature stability greater than about 350° C., for treating inorganic particulates and melt processable glass resin to improve dispersion into polymer resins, improve mixing, improve mechanical strength, promote hydrophobicity, and decrease water-vapor transmission. |
| 16. Other internal dispersants, lubricants, and mold release agents, and materials | hydrocarbon agents, such as natural and synthetic paraffins, polyethylene waxes, fluorocarbons, etc., fatty acid agents, such as stearic acid, hydroxystearic acid, other higher fatty acids, hydroxy fatty acids, etc., fatty amide agents, such as stearamide, ethylenebisstearamide, other alkylene bis fatty amides, etc., alcohol agents, such as stearyl alcohol, cetyl alcohol, other fatty alcohols, polyhydric alcohols, polyglycols, polyglycerols, etc. fatty acid ester agents, such as butyl stearate, pentaerythritol tetrastearate, other fatty acid esters of lower alcohols, fatty acid esters of polyhydric and monohydric alcohols, fatty acid esters of polyglycols, etc., and silicone mold release agents, such as silicone oils, etc., these agents being thermally stable to about 350° C., and in one embodiment preferably up to about 400° C.; pigments, dyes, optical brighteners, flame retardants, and conductive polymers. |
| 17. Alkoxysilanes as additives for enhancing thermal stability | Phenyltrialkoxysilane such as phenyltrimethoxysilane (Dynasylan 9165) alone or in combination with a diaminotrialkoxysilane such as N-(2-aminoethyl)-3-aminopropyltrimethoxy silane (Dynasylan DAMO). |

Examples of suitable high temperature polymer compositions in accordance with the disclosed invention may include the compositions listed in Table 13.

TABLE 13

| Material | Additive/% by Weight of Total Thermoplastic Composition: | | | |
|---|---|---|---|---|
| | Table 6 | Table 7 | Table 8 | Table 9 |
| Additive Composition from Table 6, 7 or 8 | | | | |
| 1. Additive Composition (wt %) | 0.35 | 0.60 | 0.65 | 0.75 |
| 2. Alkoxysilane (phenyltrimethoxysilane alone or in combination with diaminotrimethoxysilane) | 0.50 | 1.00 | 2.50 | 0.50 |
| 3. Polycarbonate resin, APEC ® TP-0277 | 99.15 | 98.40 | 96.85 | 98.75 |

The polymer composition may be made by providing the thermoplastic resin material in pellet form, heating the thermoplastic resin pellets to a suitable temperature, e.g., at least about 100° C., and in one embodiment in the range from about 100° C. to about 155° C., and in one embodiment from about 100° C. to about 135° C., and in one embodiment from about 135° C. to about 155° C., and mixing a desirable concentration of the additive composition with the heated pellets. The pellets may have any desirable shape including spheres, cubes, cylinders, rods, irregular shapes, and the like. The pellets may have an average particle size in the range from about 1 micron to about 10,000 microns, and in one embodiment from about 500 to about 1000 microns. Without being bound to any particular theory, upon mixing with the heated pellets, the additive composition is believed to melt onto the surface of the heated pellets and coat the pellets. In one embodiment, the pellets may be substantially uniformly coated with the additive composition. The alkoxysilane (e.g., phenyltrimethoxysilane alone or in combination with vinyltrimethoxysilane or diaminotrimethoxysilane) may be applied to or coated on the pellets, for example, by spraying onto the pellets, to provide the desired concentration. The resin pellets with the added alkoxysilane may be tumble blended for about 5 minutes or until the added alkoxysilane coats the resin pellets. The pellets may be heated and dried in a vacuum oven at about 80 to about 120° C. for about 2-4 hours to form a free flowing pellet mix. Alternatively, the pellets may be initially coated with the alkoxysilane, followed by coating with the additive composition. Alternatively, the polymer composition may be made by compounding pellets of a thermoplastic resin at a temperature of between 300° C. and 350° C., using a single screw or twin screw compounder having either conveying elements or low shear mixing elements; metering into the compounder at least one alkoxysilane; and metering into the compounder the coated pellets from above or a desirable concentration of additive composition.

The polymer composition may have a glass transition temperature (Tg) of at least about 180° C., and in one embodiment at least about 200° C., and in one embodiment at least about 220° C., and in one embodiment at least about 230° C., and in one embodiment at least about 240° C., and in one embodiment at least about 250° C., and in one embodiment at least about 260° C., and in one embodiment at least about 270° C., and in one embodiment at least about 275° C., and in one embodiment at least about 280° C.

While not being bound to any particular theory, it is believed that the addition of the alkoxysilane may result in a polymer composition that has a high Tg, yet a lower Tg than the Tg of polymer compositions without the alkoxysilanes. It is also believed that the polymer composition with the alkoxysilanes may exhibit a rubbery plateau region beyond the Tg of the polymer composition that extends to about 260° C. and may extend to as high as about 320° C. or more. This may mean that the polymer composition with the alkoxysilanes may not have a load bearing capacity above the Tg, but may hold or maintain a firm, rubbery state throughout, at short exposures to temperatures of about 260° C. and possibly up to about 320° C. Unexpectedly, articles molded by injection molding processes using the polymer composition with the alkoxysilanes exhibit very low mold in or flow stress and very low birefringence. This may provide utility for the inventive polymer compositions in high temperature, lead free solder reflow applications.

The thermal stability of the inventive polymer compositions may be determined using thermal gravimetric analysis (TGA). An advantage of these compositions is that they are sufficiently stable such that they may exhibit a weight loss of about 5% or less at a temperature of about 450° C. when subjected to TGA, and in one embodiment at about 455° C., and in one embodiment at about 460° C., and in one embodiment at about 462° C., and in one embodiment at about 464° C.

For most lens applications, the molded optical grade thermoplastic may have visible light transmission properties, in the visible light range of about 400-1000 nm, of at least about 85% after surface reflective losses for lens parts or products having a thickness of about 1.0 mm, and at least about 80% after surface reflective losses for lens parts or products having a thickness of about 1.5 mm. This difference may be due to light transmission being thickness related. In addition, these optical grade thermoplastic lens parts or products may have other important properties. These may include high optical clarity, very low color, very low haze, photolytic stability, hydrolytic stability, and thermal stability for operational use in environments from about −20° C. to about 85° C., inclusive of environments with a relative humidity greater than about 80%. In many LED lighting applications, the polymer composition may have an operating temperature capability in excess of about 100° C., and, in other cases, in excess of about 150° C. In many cases, the molded material may have a clean surface on which optical coatings can be attached and bonded. Table 14 provides a summary of the optical, mechanical, and material properties that may be achieved using the inventive polymer composition for making injection molded plastic lenses.

TABLE 14

| | |
|---|---|
| Water-WhiteClarity/CleanOptical Surfaces/Injection Moldable | Low Haze (0.5); Low Color (Y.I./0.5); High Visible Light Transmission 90%) |
| Superior Impact Resistance | High Index of Refraction (1.555/High Light Output) |
| High Visible Light Transmission | Surface Treatable: (AR Coatings/Max. Illumination) |
| Excellent Thermal Oxidative Stability | High Tg (>250° C./DMTA 2° C./min. ramp) |
| Excellent Hydrolytic Oxidation Stability | Excellent Photolytic Oxidative Stability (450 nm) |
| Hydrophobic surfaces | Very low mold-in stress and birefringence |

The optical and/or physical properties of the polymer composition may be unsuitable for various applications, and, therefore, it may be advantageous to upgrade and customize the polymer composition by compounding before their use to satisfy the requirements of the desired application. Conventional compounding of a polymer composition at high melt temperatures, particularly higher than about 300° C., may result in an additional heat history that may be disadvantageous. At these processing temperatures, a thermoplastic resin such as polycarbonate may degrade. Degradation of the thermoplastic resin and certain additive materials may manifest itself in discoloration, e.g., yellowing, which may reduce its light transmission in the visible part of the light spectrum making the molded article less suitable or unsuitable for use as a lens. This problem may be intensified when organic additives are present and the processing temperatures ranges from about 300 to about 400° C. as the organic materials may volatilize and cause further yellowing and black specs to form.

While optical thermoplastic compositions in accordance with the invention may be processed with conventional compounding methods, in one embodiment, an optical device may be manufactured in a continuous injection molding process leading directly from the raw material to the molded article. The additive composition, polymer composition, and methods for making the same, as described herein, may provide smooth, dry, additive coated thermoplastic pellets, which may be injection moldable without compounding, and the molded article, e.g., optical lens, may be processed directly from the raw materials to form the final molded article, e.g., optical lens. Using the inventive additive compositions and polymer compositions, and employing the methods to manufacture the coated thermoplastic pellets, a plastic lens may be injection molded having optical properties which are superior to the optical properties of the thermoplastic resin used in the polymer composition. The manufacturing of the thermoplastic pellets may be cost effective and may be accomplished using existing drying and tumbling equipment. The method for manufacturing the coated pellets, as described herein, may be particularly useful in making camera and LED lens articles that are extremely small, weighing only, in some cases, 0.25 grams (the approximate weight of one or two pellets). By coating pellets substantially uniformly, each pellet may contain about 100% by weight of the entire polymer composition, ensuring that each lens part made may also comprise about 100% by weight of the polymer composition. When incorporating more than about 2% by weight of inorganic particulates and/or melt processable glass reinforcing resins into the polymer composition, it may be useful to first compound the inorganic particulates and/or melt processable glass reinforcing resins into the polymer composition using conventional compounding methods and up to about 0.3% by weight of each of a high temperature stable dispersing agent and/or primary antioxidant to form the pellets. The pellets may then be coated with the additive composition as described above, followed by injection molding and/or extruding. Alternatively, it may be useful to first coat the pellets substantially uniformly with the additive composition as described above including the alkoxysilanes, and then compound the inorganic particulates and, optionally, the melt processable glass reinforcing resin into the polymer composition by conventional compounding methods.

Molded articles, for example, those having a thickness of about 1 mm, made from the inventive polymer composition may have an index of refraction of about 1.55, and in one embodiment about 1.56. These molded articles may have a luminous transmittance of at least about 85% of the maximum theoretical value of the luminous transmittance, and in one embodiment at least about 88%. The molded articles may have of haze of less than about 3, and in one embodiment less than about 1. They may have a yellowness index of less than about 3, and in one embodiment less than about 1. The molded articles may have a visible light transmission of at least about 85% after surface reflective losses, and in one embodiment at least about 88%.

The inventive polymer composition may provide numerous advantages over prior art materials, including one of more of the following. The polymer compositions, when molded, may have excellent optical properties. Lenses made with the polymer compositions may have a high index of refraction, which may be useful for making camera lenses and LED lens with high illumination capability. The camera lenses may include high temperature light transmissible thermoplastic (HTLT) cellular camera lenses and HTLT LED lenses. The camera lenses may be used in camera modules for use in making cameras, for example, mobile phone cameras. Lenses made with the polymer compositions may have a high glass transition temperature and may be used in solder reflow applications, particularly lead free solder reflow applications which may have high operating temperatures. The polymer compositions may have a viscosity lower than the base thermoplastic resin so that conventional plastic processing techniques may be used. The polymer compositions may be molded at temperatures in the range from about 300° C. to about 400° C. without compromising optical, mechanical and/or other physical properties of the molded articles, e.g., molded lenses. The polymer compositions may be injected into molds having temperatures as high as about 235° C. without sticking and without the use of external mold release agents. This may include processes where the resultant molded article, such as a molded lens part, may be annealed or stress relieved in the hot molds as a normal part of the molding process. The polymer compositions, when molded, may be effectively annealed or stressed relieved with conventional annealing methods, resulting in improved or optimized mechanical and thermal properties. The polymer compositions, when molded, may have superior thermal oxidative, hydrolytic oxidative, and/or photolytic oxidative resistance properties and remain stable and clear in a wide variety of environmental conditions suitable for applications such as LED's and automotive headlights. The polymer compositions may be used to accurately mold extremely small lens parts having details as fine as micron and sub-micron in size. The lenses produced from the polymer compositions may be surface treated with a wide variety of organic and/or metal oxide coatings, including anti-reflective coatings. The underside of the lenses may be filled and bonded with adhesives and soft silicone encapsulents for LED and other semiconductor and electronic applications.

The polymer composition, and the methods for making the same, may not be limited to use in high temperature, optical thermoplastic composites. The polymer composition may be used alone or in combination with other additives to make high temperature pigment filled, mineral filled, and/or nanomaterial filled composites, including high index of refraction, optical nanomaterial thermoplastic composites, using a high temperature thermoplastic resin in accordance with the disclosed invention or other thermoplastic resins, e.g., polycarbonate and polysulfone resins, encompassing many of the features and benefits of the disclosed polymer compositions and molded articles made from the same. The polymer composition may also be used to make optical thermoplastic composite materials using other thermoplastic resins, e.g., polycarbonate and polysulfone resins, having lower temperature resistant properties, yet resulting in thermoplastic composite materials encompassing many of the same features and benefits of the disclosed high temperature thermoplastic composite materials.

The polymer compositions of this invention, whether optically clear, translucent or opaque, made with the disclosed alkoxysilanes, and/or inorganic particulates, and/or glass reinforcing resins, may be useful for making other molded articles for use in lead free solder reflow applications, such as mounting devices for LED lenses, and camera module cases for cellular camera lenses.

While not wishing to be bound by theory, it is believed that the inclusion of compounds containing phenyl groups and aluminum oxide materials in the inventive polymer compositions provides for a reduction of stress in the mold when the polymer compositions are molded. This is believed to result in a reduction in the warping of articles made from the inventive polymer composition when such articles are exposed to temperatures exceeding the glass transition temperature of the polymer composition.

The invention may be further understood with reference to the following examples. The examples are provided for the purpose of further illustrating various aspects of the invention and are not intended to limit the invention in any manner.

Example 1

A dye concentrate is prepared by mixing and grinding the materials shown in the following Table 15:

TABLE 15

| Material: | % by Weight of Total Dye Concentrate Formula: |
|---|---|
| Mixture of saturated and unsaturated fatty esters; INT-40DHT | 99.4 |
| High temperature stable blue dye/dry powder; Amplast Blue R3 Dye | 0.2 |
| High temperature stable violet dye/dry powder; Amplast Violet BV Dye | 0.2 |
| Inorganic particulates with average particle size <100 nm; Aluminium Oxide C | 0.2 |
| Total | 100 |

An additive composition is prepared by mixing and grinding the foregoing dye concentrate and the materials listed in the following Table 16:

TABLE 16

| Material: | % by Weight of Total Additive Composition: |
|---|---|
| Mixture of saturated and unsaturated fatty esters; INT-40 DHT | 56 |
| Dye Concentrate; Dye Concentrate Formula from Table 14 | 1 |
| Inorganic particulates with average particle size <100 nm; Aluminium Oxide C | 8 |
| High molecular weight, low volatility secondary antioxidant; Doverphos S-9228PC | 35 |
| Total | 100 |

The polymer composition shown in Table 17 is prepared using APEC®TP-0277 polycarbonate resin pellets and the additive composition shown in Table 16. The resin pellets are dried at 135° C. in a vacuum oven for 4 hours or until the moisture content is less than 0.005% by weight. The resin pellets are heated to 135° C., and the additive composition from Table 16 is added to the resin pellets at a weight ratio of 0.6:99.4 in a tumble blender. The resin pellets and additive composition are tumble blended for 5 minutes or until the additive composition melts onto and coats the resin pellets. The coated resin pellets are cooled at room temperature under vacuum to a smooth, dry condition. The coated resin pellets are sprayed with phenlytrimethoxysilane at room temperature to provide the concentration indicated in Table 16. The coated pellets are tumbled for 5 minutes. The coated pellets can then be directly molded by either injection molding or injection compression molding methods; or, the coated pellets can be dried at 120° C. for 4 hours in a vacuum oven and then cooled to room temperature under vacuum and vacuum packaged in an air tight package for use later. The pellets are smooth and free flowing. Alternatively, the coated pellets can be compounded in a single screw or twin screw extruder having either or conveying element or a low shear type element and at the same time metering the phenlytrimethoxysilane into the molten polymeric composition. Alternatively, the resin pellets can be compounded in the same compounder, using the same methods as above, and at the same time metering the additive composition from Table 16 and the phenlytrimethoxysilane into the molten resin.

TABLE 17

| Material: | % by Weight of Total Thermoplastic Composition: |
|---|---|
| Mixture of saturated and unsaturated fatty esters; INT 40 DHT | 0.38 |
| Dye Concentrate from Table 14 | 0.010 |
| Inorganic particulates with average particle size <100 nm; Aluminium Oxide C | 0.04 |
| High molecular weight, low volatility secondary antioxidant; Doverphos S-9228PC | 0.17 |
| Phenyltrimethoxysilane (Dynasylan 9165) | 1.0 |
| Polycarbonate resin,; APEC ® TP-0277 (Tg 235° C.) | 98.4 |
| Total | 100.0 |

An injection molded, polymeric lens article is made using the coated resin pellets described above. Either the coated pellets or the compounded pellets are heated at 125° C. to provide for a moisture level content of less than 0.01% by weight. A hopper on the injection molding machine is heated to about 80° C. A nitrogen blanket over the hopper is employed.

Either the coated resin pellets or the compounded pellets are injection molded or injection-compression molded with a screw injection machine. The barrel capacity is sufficient to provide for a shot size of the pellets between 50 and 75% of capacity to minimize residence time in the barrel. The stock temperature is in the range from 320° C. to 380° C. Mold temperatures of 150° C. to 225° C. are used. The molding process conditions are as follows:

Injection Molding Processing Conditions

Nozzle 340-380° C.
Front 335-360° C.
Middle 330-350° C.
Rear 300-330° C.

The molded article has the following optical properties:

Index of refraction/589.93 nm/1.5 mm thickness/ASTM D-542

1.50-1.555

Actual light transmittance (1.5 mm thickness) %/ASTM D 1746

| 405 nm | 85.12% |
| 450 nm | 86.87 |
| 505 nm | 87.76 |
| 550 nm | 88.18 |
| 605 nm | 88.63 |
| 650 nm | 89.08 |
| 705 nm | 89.43 |
| 750 nm | 89.65 |
| 805 nm | 89.91 |
| 850 nm | 89.98 |
| 900 nm | 89.06 |
| 950 nm | 90.05 |
| 1000 nm | 89.20 |

Haze, 1.5 mm thickness/ASTM D 1003
<2.0
Yellowness Index/1.5 mm thickness/ASTM E313
<2.0

The coated resin pellets (sample size 11.5970 mg) are subjected to thermal gravimetric analysis (TGA) using a Universal V3.OG TA instrument. The results are shown in FIG. 1. These results show a 5% weight loss at 464.60° C.

Example 2

A dye concentrate is prepared by mixing and grinding the materials shown in the following Table 18.

TABLE 18

| Material: | % by Weight of Total Dye Concentrate Formula: |
|---|---|
| Mixture of saturated and unsaturated fatty esters; INT-40DHT | 99.4 |
| High temperature stable blue dye/dry powder; Amplast Blue R3 Dye | 0.2 |

TABLE 18-continued

| Material: | % by Weight of Total Dye Concentrate Formula: |
|---|---|
| High temperature stable violet dye/dry powder; Amplast Violet BV Dye | 0.2 |
| Inorganic particulates with average particle size <100 nm; Aluminium Oxide C | 0.2 |
| Total | 100 |

An additive composition is prepared by mixing and grinding the foregoing dye concentrate and the materials listed in the following Table 19:

TABLE 19

| Material: | % by Weight of Total Additive Composition: |
|---|---|
| Mixture of saturated and unsaturated fatty esters; INT-40 DHT | 47 |
| Dye Concentrate; Dye Concentrate Formula from Table 18 | 1 |
| Inorganic particulates with average particle size <100 nm; Aluminium Oxide C | 6 |
| Antihydrolysis agent, calcined aluminum oxide, Puralox K-160 | 15 |
| Biphenol, 4,4' biphenol | 8 |
| High molecular weight, low volatility secondary antioxidant; Doverphos S-9228PC | 23 |
| Total | 100 |

The polymer composition shown in Table 20 is prepared using APEC®TP-0277 polycarbonate resin pellets and the additive composition shown in Table 19. The resin pellets are dried at 135° C. in a vacuum oven for 4 hours or until the moisture content is less than 0.005% by weight. The resin pellets are heated to 135° C., and the additive composition from Table 19 is added to the resin pellets at a weight ratio of 0.75 in a tumble blender. The resin pellets and additive composition are tumble blended for 5 minutes or until the additive composition melts onto and coats the resin pellets. The coated resin pellets are stored under vacuum or in an air tight container. The pellets are smooth and free flowing. If necessary, the coated pellets can be re-dried under vacuum so the moisture content is kept less than 0.005% by weight. The coated pellets are compounded at about 325° C.-335° C. in a single screw or twin screw extruder having either a conveying element or a low shear type element and at the same time metering the phenlytrimethoxysilane into the molten polymeric composition.

TABLE 20

| Material: | % by Weight of Total Thermoplastic Composition: |
|---|---|
| Mixture of saturated and unsaturated fatty esters; INT 40 DHT | 0.35 |
| Dye Concentrate from Table 18 | 0.010 |
| Inorganic particulates with average particle size <100 nm; Aluminium Oxide C | 0.045 |
| High molecular weight, low volatility secondary antioxidant; Doverphos S-9228PC | 0.1725 |
| Antihydrolysis agent, calcined aluminum oxide, Puralox K-160 Biphenol, 4,4' biphenol | 0.1125 0.06 |
| Phenyltrimethoxysilane (Dynasylan 9165) | 0.5 |
| Polycarbonate resin,; APEC ® TP-0277 (Tg 235° C.) | 98.75 |
| Total | 100.0 |

An injection molded, polymeric lens article is made using the coated resin pellets described above. Either the coated pellets or the compounded pellets are heated at 125° C. to provide for a moisture level content of less than 0.01% by weight, and preferably to less than 0.005% by weight. A hopper on the injection molding machine is heated to about 80° C. A nitrogen blanket over the hopper is employed.

Either the coated resin pellets or the compounded pellets are injection molded or injection-compression molded with a screw injection machine. The barrel capacity is sufficient to provide for a shot size of the pellets between 50 and 75% of capacity to minimize residence time in the barrel. The stock temperature is in the range from 320° C. to 380° C. Mold temperatures of 150° C. to 225° C. are used. The molding process conditions are as follows:

Injection Molding Processing Conditions

Nozzle 340-380° C.
Front 335-360° C.
Middle 330-350° C.
Rear 300-330° C.

The molded article has the following optical properties:
Index of refraction/589.93 nm/1.5 mm thickness/ASTM D-542
1.555-1.56
Actual light transmittance (1.5 mm thickness) %/ASTM D 1746

| | |
|---|---|
| 405 nm | 86.36% |
| 450 nm | 88.27 |
| 505 nm | 89.05 |
| 550 nm | 89.29 |
| 605 nm | 89.64 |
| 650 nm | 89.91 |
| 705 nm | 90.16 |
| 750 nm | 90.36 |
| 805 nm | 90.57 |
| 850 nm | 90.90 |
| 900 nm | 90.33 |
| 950 nm | 90.73 |
| 1000 nm | 89.47 |

Haze, 1.5 mm thickness/ASTM D 1003
<2.0
Yellowness Index/1.5 mm thickness/ASTM E313
1.4

Figure 2:
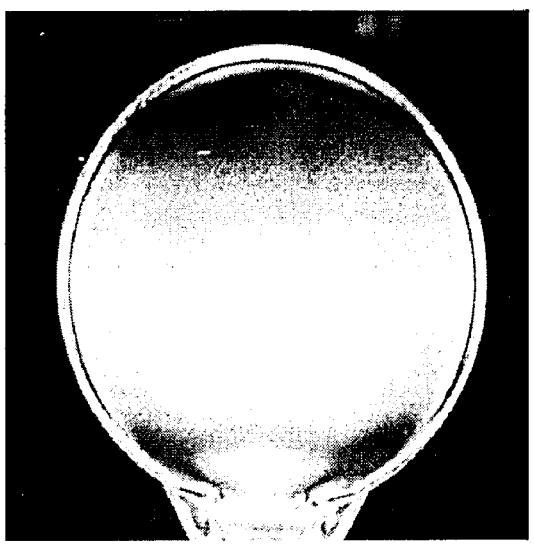
FIG. 2 shows images produced with cross polarizers of two molded articles and a comparison of the flow or mold-in stress in both molded articles. The images show that the optical article (Image No. 2) molded with the polymer composition of Example 2 comprising 0.5% by weight of a phenylalkoxysilane by the total weight of the polymer composition exhibits up to about 70% less flow or mold-in stress than an optical article molded from essentially the same polymer composition without the addition of phenylalkoxysilane.
Figure 2:
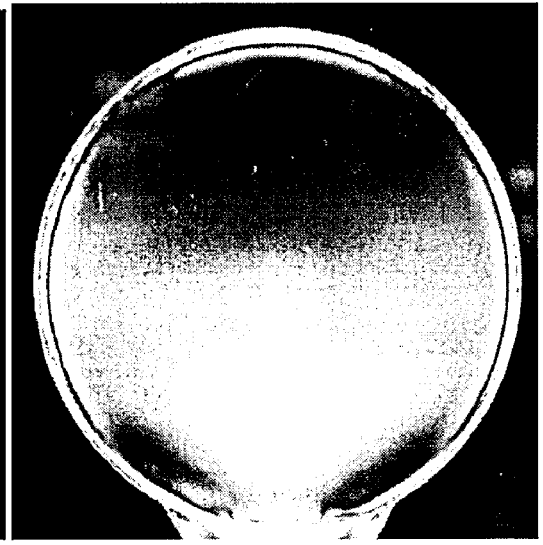

The molded article exhibits very low flow or mold-in stress compared to a molded article made without the addition of an alkoxysilane. FIG. 2 shows two molded articles examined under cross polarized light and the images show that the optical article (Image No. 2) molded with the polymer composition of Example 2 comprising 0.5% by weight of an a phenylalkoxysilane by the total weight of the polymer composition exhibits up to about 70% less flow or mold-in stress than an optical article molded from essentially the same polymer composition without the addition of the phenylalkoxysilane.

While the invention has been described with reference to various embodiments, it is to be understood that various modifications may become apparent to those skilled in the art upon reading the specification. Therefore, it is to be understood that the invention includes all such modifications that may fall within the scope of the appended claims.

The invention claimed is:

1. An additive composition made by combining:
   (a) at least one dispersant;
   (b) inorganic particulates having an average particle size in the range up to about 100 nanometers, the inorganic particulates having an index of refraction in the range from about 1.4 to about 3;
   (c) at least one phenylalkoxysilane, biphenol, trisilanolphenyl polyhedral oligomeric silesquioxane, or a mixture of two or more thereof; and
   (d) at least one dye concentrate comprising (i) at least one dispersant, (ii) at least one bluing agent, and (iii) inorganic particulates having an average particle size in the range up to about 100 nanometers, the inorganic particulates having an index of refraction in the range from about 1.4 to about 3;
   with the proviso that when the trisilanolphenyl polyhedral oligomeric silesquioxane is in the form of particulates with an average particle size up to about 100 nanometers, the trisilanolphenyl polyhedral oligomeric silesquioxane particulates are optionally used both as component (c) and as a partial or complete replacement for component (b).

2. A method of making a polymer composition, comprising:
   heating pellets of a thermoplastic resin at a temperature of at least about 70° C., the thermoplastic resin having a glass transition temperature of at least about 220° C.; and
   coating the pellets with the additive composition of claim 1.

3. A process of forming an article, comprising:
   feeding pellets comprising a thermoplastic resin having a glass transition temperature of at least about 220° C. coated with the additive composition of claim 1 to an injection molding apparatus and molding the article.

4. A polymer composition, comprising:
   (i) at least one thermoplastic resin having a glass transition temperature of at least about 220° C.;
   (ii) at least one phenylalkoxysilane, biphenol, trisilanolphenyl polyhedral oligomeric silesquioxane, or mixture of two or more thereof;
   (iii) inorganic particulates having an average particle size in the range up to about 100 nanometers dispersed in the thermoplastic resin, the inorganic particulates having an index of refraction in the range from about 1.4 to about 3; and
   (iv) an effective amount of at least one dispersant to disperse the inorganic particulates in the thermoplastic resin;
   with the proviso that when the trisilanolphenyl polyhedral oligomeric silesquioxane is in the form of particulates with an average particle size up to about 100 nanometers, the trisilanolphenyl polyhedral oligomeric silesquioxane particulates are optionally used both as component (ii) and as a partial or complete replacement for the inorganic particulates in component (iii);
   wherein the biphenol comprises 4,4'-biphenol.

5. A polymer composition, comprising:
   (i) at least one thermoplastic resin having a glass transition temperature of at least about 220° C.;
   (ii) at least one phenylalkoxysilane, biphenol, trisilanolphenyl polyhedral oligomeric silesquioxane, or mixture of two or more thereof;
   (iii) inorganic particulates having an average particle size in the range up to about 100 nanometers dispersed in the thermoplastic resin, the inorganic particulates having an index of refraction in the range from about 1.4 to about 3; and
   (iv) an effective amount of at least one dispersant to disperse the inorganic particulates in the thermoplastic resin;
   with the proviso that when the trisilanolphenyl polyhedral oligomeric silesquioxane is in the form of particulates with an average particle size up to about 100 nanometers, the trisilanolphenyl polyhedral oligomeric silesquioxane particulates are optionally used both as component (ii) and as a partial or complete replacement for the inorganic particulates in component (iii);
   wherein the trisilanolphenyl polyhedral oligomeric silesquioxane is in the form of particulates with an average particle size of up to about 100 nanometers.

6. A polymer composition, comprising:
   (i) at least one thermoplastic resin having a glass transition temperature of at least about 220° C.;
   (ii) at least one phenylalkoxysilane, biphenol, trisilanolphenyl polyhedral oligomeric silesquioxane, or mixture of two or more thereof;
   (iii) inorganic particulates having an average particle size in the range up to about 100 nanometers dispersed in the thermoplastic resin, the inorganic particulates having an index of refraction in the range from about 1.4 to about 3; and
   (iv) an effective amount of at least one dispersant to disperse the inorganic particulates in the thermoplastic resin;
   with the proviso that when the trisilanolphenyl polyhedral oligomeric silesquioxane is in the form of particulates with an average particle size up to about 100 nanometers, the trisilanolphenyl polyhedral oligomeric silesquioxane particulates are optionally used both as component (ii) and as a partial or complete replacement for the inorganic particulates in component (iii);
   wherein the composition further comprises at least one bluing agent, at least one ultraviolet light absorber, at least one antioxidant, or a mixture of two or more thereof;
   wherein the bluing agent comprises at least one blue dye, at least one violet dye, or a mixture thereof.

* * * * *